United States Patent
Wakabayashi

(10) Patent No.: US 11,468,868 B2
(45) Date of Patent: Oct. 11, 2022

(54) INFORMATION PROCESSING APPARATUS AND INFORMATION PROCESSING METHOD TO PERFORM TRANSITION DISPLAY CONTROL

(71) Applicant: SONY CORPORATION, Tokyo (JP)

(72) Inventor: Hajime Wakabayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/770,731

(22) PCT Filed: Oct. 3, 2018

(86) PCT No.: PCT/JP2018/037084
§ 371 (c)(1),
(2) Date: Jun. 8, 2020

(87) PCT Pub. No.: WO2019/123770
PCT Pub. Date: Jun. 27, 2019

(65) Prior Publication Data
US 2021/0166661 A1    Jun. 3, 2021

(30) Foreign Application Priority Data

Dec. 20, 2017 (JP) .............................. JP2017-244026

(51) Int. Cl.
*G09G 5/00* (2006.01)
*G09G 5/377* (2006.01)
(Continued)

(52) U.S. Cl.
CPC ......... *G09G 5/377* (2013.01); *G02B 27/0172* (2013.01); *G02B 27/0179* (2013.01);
(Continued)

(58) Field of Classification Search
CPC ...... G09G 5/377; G02B 27/0172; G06F 3/012
(Continued)

(56) References Cited

U.S. PATENT DOCUMENTS

| 2002/0084974 A1 | 7/2002 | Ohshima et al. |
| 2009/0005961 A1* | 1/2009 | Grabowski ............ G02B 27/01 |
| | | 701/532 |

(Continued)

FOREIGN PATENT DOCUMENTS

| CN | 104635338 A | 5/2015 |
| CN | 105246743 A | 1/2016 |

(Continued)

OTHER PUBLICATIONS

International Search Report and Written Opinion of PCT Application No. PCT/JP2018/037084, dated Jan. 8, 2019, 08 pages of ISRWO.

(Continued)

*Primary Examiner* — Jonathan M Blancha
(74) *Attorney, Agent, or Firm* — Chip Law Group

(57) ABSTRACT

Use of the AR technology is facilitated. [Solution] Such an information processing apparatus is provided that includes a control unit that controls a display to superimpose a virtual object, associated with a set position in the real world, on the real world with reference to position and orientation information indicative of the position and the orientation of a mobile body, and a correction unit that corrects the position and orientation information. When the position and orientation information is corrected from first position and orientation information to second position and orientation information that is non-continuous to the first position and orientation information, the control unit controls the display to perform transition display that indicates transition of display conditions from a first display condition, which displays the virtual object based on the first position and orientation information, to a second display condition based on the second position and orientation information.

21 Claims, 17 Drawing Sheets

(51) Int. Cl.
  *G02B 27/01*    (2006.01)
  *G06F 3/01*     (2006.01)
  *G09G 5/38*     (2006.01)

(52) U.S. Cl.
  CPC .............. *G06F 3/012* (2013.01); *G09G 5/38* (2013.01); *G02B 2027/0141* (2013.01); *G02B 2027/0178* (2013.01); *G02B 2027/0187* (2013.01); *G09G 2340/0492* (2013.01); *G09G 2354/00* (2013.01)

(58) Field of Classification Search
  USPC ........................................................ 345/156
  See application file for complete search history.

(56) References Cited

U.S. PATENT DOCUMENTS

| | | | |
|---|---|---|---|
| 2015/0123997 A1 | 5/2015 | Hayasaka et al. | |
| 2016/0035140 A1* | 2/2016 | Bickerstaff ........ | G02B 27/0179 345/633 |
| 2016/0035352 A1 | 2/2016 | Furumoto et al. | |
| 2016/0123742 A1 | 5/2016 | Tawara et al. | |
| 2016/0246384 A1* | 8/2016 | Mullins .................. | G06F 3/011 |
| 2016/0284125 A1* | 9/2016 | Bostick .................. | G06Q 50/01 |
| 2017/0012643 A1 | 1/2017 | Lai et al. | |
| 2017/0061702 A1* | 3/2017 | Christen .............. | G02B 27/017 |
| 2017/0069214 A1* | 3/2017 | Dupray ................ | G08G 5/0013 |
| 2017/0186237 A1 | 6/2017 | Hirota et al. | |
| 2018/0272231 A1 | 9/2018 | Katoh et al. | |

FOREIGN PATENT DOCUMENTS

| | | |
|---|---|---|
| CN | 105320271 A | 2/2016 |
| CN | 105431708 A | 3/2016 |
| CN | 108139204 A | 6/2018 |
| CN | 108603749 A | 9/2018 |
| DE | 69835321 T2 | 12/2006 |
| EP | 0899690 A2 | 3/1999 |
| EP | 2966863 A1 | 1/2016 |
| EP | 3343167 A1 | 7/2018 |
| JP | 2003-216552 A | 7/2003 |
| JP | 2003-216552 A1 | 7/2003 |
| JP | 2011-203823 A | 10/2011 |
| JP | 5825328 B2 | 12/2015 |
| JP | 2016-018213 A | 2/2016 |
| JP | 2016-018213 A1 | 2/2016 |
| JP | 2017-015485 A | 1/2017 |
| JP | 2017-111723 A | 6/2017 |
| JP | 6556015 B2 | 8/2019 |
| JP | 6723743 B2 | 7/2020 |
| KR | 10-2016-0007423 A | 1/2016 |
| KR | 10-2016-0122702 A | 10/2016 |
| KR | 10-2017-0005406 A | 1/2017 |
| WO | 2014/188512 A1 | 11/2014 |
| WO | 2014/203592 A1 | 12/2014 |
| WO | 2017/061388 A1 | 4/2017 |
| WO | 2017/134886 A1 | 8/2017 |

OTHER PUBLICATIONS

Extended European Search Report of EP Application No. 18891366.9, dated Jan. 11, 2021, 08 pages.
Office Action for KR Patent Application No. 10-2020-7016033, dated May 24, 2022, 03 pages of English Translation and 04 pages of Office Action.

* cited by examiner

TIME T21

TIME T22

TIME T51

TIME T52

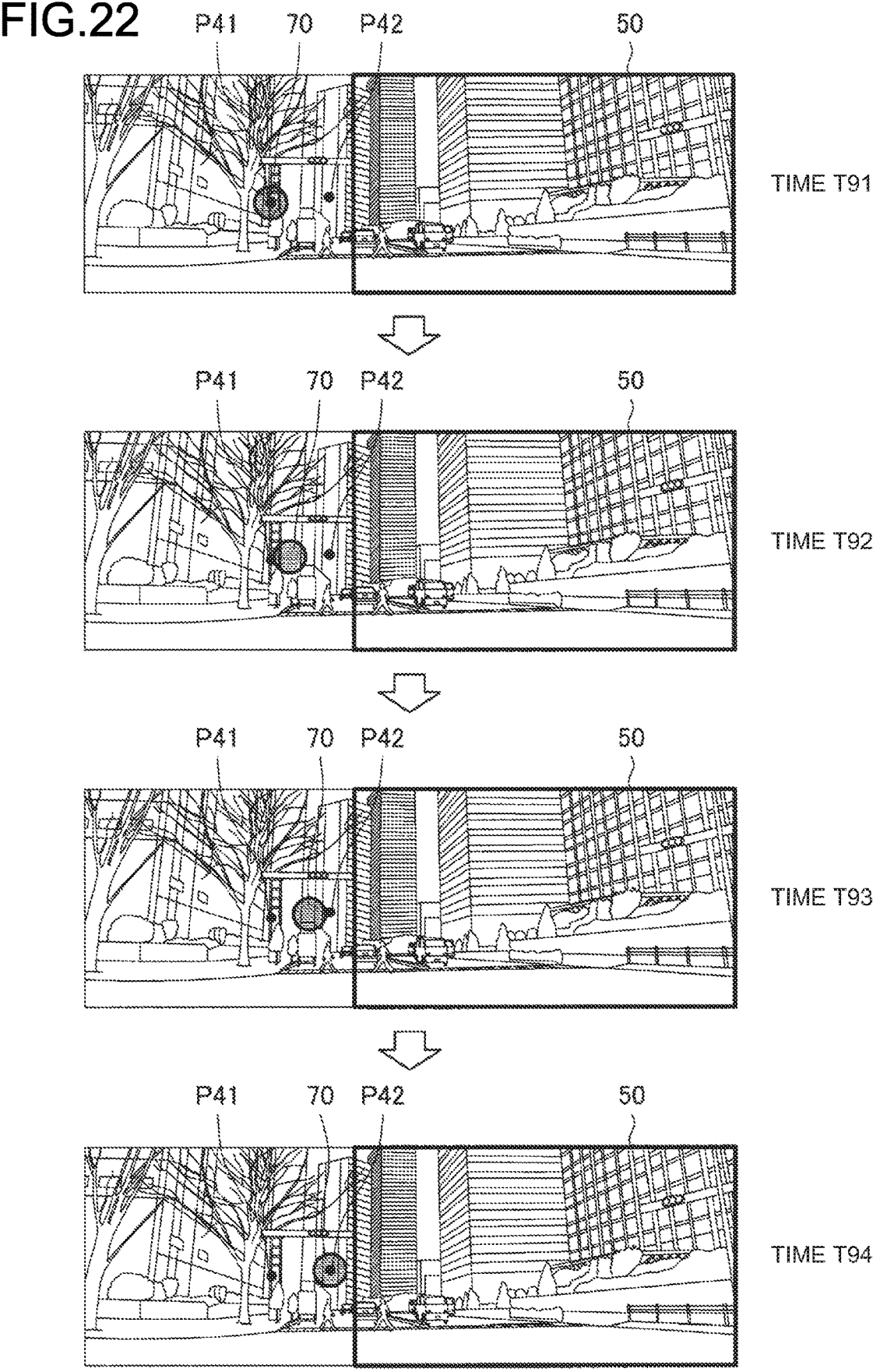

INFORMATION PROCESSING APPARATUS AND INFORMATION PROCESSING METHOD TO PERFORM TRANSITION DISPLAY CONTROL

CROSS REFERENCE TO RELATED APPLICATIONS

This application is a U.S. National Phase of International Patent Application No. PCT/JP2018/037084 filed on Oct. 3, 2018, which claims priority benefit of Japanese Patent Application No. JP 2017-244026 filed in the Japan Patent Office on Dec. 20, 2017. Each of the above-referenced applications is hereby incorporated herein by reference in its entirety.

FIELD

The present disclosure relates to an information processing apparatus, a information processing method, and a computer program.

BACKGROUND

Technologies referred to as augmented reality (AR), which superimpose and present additional information on the real world, have been increasingly drawn an attention. The AR technology is implemented by, for example, a head-mounted display (HMD), which is a display to be put on the head of a user. There are various types of display for the technology, such as an optical see-through HMD that superimposes and displays a virtual object on the real world in the user's field of view and a video see-through HMD that captures the real world and superimposes and displays a virtual object on the real world in the image obtained by capturing (for example, see Patent Literature 1).

CITATION LIST

Patent Literature

Patent Literature 1: JP 2011-203823 A

SUMMARY

Technical Problem

It is, however, sometimes difficult for users to properly use such a traditional AR technology. For example, in an AR technology using an HMD, a superimposing-display of a virtual object associated with a set position in the real world, on the real world, can be controlled in accordance with position and orientation information indicative of the position and the orientation of the HMD. Thus, the virtual object can be superimposed on the set position without relying on the actual position and orientation of the HMD. However, an error of the position and orientation information sometimes occurs due to, for example, a detection error in a sensor for detecting the position and the orientation of the HMD. The error may cause a deviation between the superimposed position of the virtual object and the set position. The position and orientation information thus needs to be corrected. If the position and orientation information are corrected, the change in the superimposed position of the virtual object may be steep. Thus, a user may feel uncomfortable or the like, and thereby, to facilitate use of the AR technology by a user may be difficult.

In the present disclosure, new and improved information processing apparatus, information processing method, and computer program are provided to facilitate use of the AR technology by users.

Solution to Problem

According to the present disclosure, an information processing apparatus is provided that includes: a control unit that controls a display to superimpose a virtual object, associated with a set position on a real world, on the real world with reference to position and orientation information indicative of a position and an orientation of a mobile body; and a correction unit that corrects the position and orientation information, wherein when the position and orientation information is corrected from first position and orientation information to second position and orientation information that is non-continuous to the first position and orientation information, the control unit controls the display to perform transition display that indicates transition of a display condition from a first display condition that displays the virtual object based on the first position and orientation information to a second display condition that displays the virtual object based on the second position and orientation information.

Moreover, according to the present disclosure, a information processing method is provided that includes: controlling a display to superimpose a virtual object, associated with a set position on a real world, on the real world with reference to position and orientation information indicative of a position and an orientation of a mobile body; and correcting the position and orientation information, wherein when the position and orientation information is corrected from first position and orientation information to second position and orientation information that is non-continuous to the first position and orientation information, the control unit controls the display to perform transition display that indicates transition of a display condition from a first display condition that displays the virtual object based on the first position and orientation information to a second display condition based on the second position and orientation information.

Moreover, according to the present disclosure, a computer program is provided that causes a computer to function as: a control unit that controls a display to superimpose a virtual object, associated with a set position on a real world, on the real world with reference to position and orientation information indicative of a position and an orientation of a mobile body; and a correction unit that corrects the position and orientation information, wherein when the position and orientation information is corrected from first position and orientation information to second position and orientation information that is non-continuous to the first position and orientation information, the control unit controls the display to perform transition display that indicates transition of a display condition from a first display condition that displays the virtual object based on the first position and orientation information to a second display condition based on the second position and orientation information.

Advantageous Effects of Invention

As described above, according to the present disclosure, use of the AR technology by users is facilitated.

The above effect is not necessarily limiting. Along with the effect, or instead of the effect, the present disclosure may exert any of advantageous effects presented in the specification and other effects that could be conceived of based on the specification.

BRIEF DESCRIPTION OF DRAWINGS

FIG. 22 is an illustrative drawing that indicates an example of display transition in the transition display control, performed upon determination that no virtual object is displayed in a display region either right before the start of the transition display control or right after the termination of the transition display control.

DESCRIPTION OF EMBODIMENTS

Figure 1:
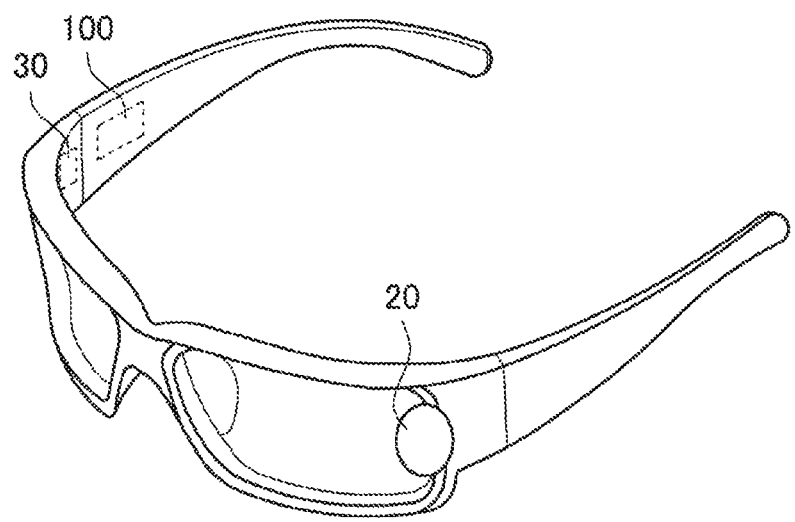
FIG. 1 is a schematic drawing that schematically illustrates an example configuration of a display according to an embodiment of the present disclosure.

Preferred embodiments of the present disclosure will now be described in detail with reference to the accompanying drawings. In the specification and drawings, components having substantially the same functional configuration will be indicated by the same reference numeral, and repeated description thereof will be omitted.

The description will proceed according to the following contents.
1. Configuration of display
2. Operation of information processing apparatus
2-1. General flow of processing
2-2. Transition display control
2-2-1. First transition display control
2-2-2. Second transition display control
2-2-3. Third transition display control
2-2-4. Supplement
3. Effects of information processing apparatus
4. Summary

1. Configuration of Display

A display 1 according to an embodiment of the present disclosure will be described with reference to FIG. 1 to FIG. 4.

FIG. 1 is a schematic drawing that schematically illustrates an example configuration of the display 1 according to the embodiment.

The display 1 is a head-mounted display, which is a type of display worn on the head of a user during use. The display 1 is, for example, an optical see-through head-mounted display (HMD) that superimposes and displays a virtual object on the real world in the field of view of a user. For example, the display 1 includes a see-through member facing the eyes of the user wearing the display and a mechanism that projects an image onto the see-through member. An image is projected onto the see-through member, reflected thereon, and enters the eyes of the user, whereby the user visually recognizes the image as a virtual image. Thus, the superimposing-display of the virtual object on the real world can be realized. The display 1 is an example of a mobile body according to the present disclosure.

As illustrated in FIG. 1, the display 1 includes a camera 20, a position and orientation sensor 30, and an information processing apparatus 100.

The camera 20 captures the real world in the field of view of a user. The camera 20 outputs a captured image of the real world to the information processing apparatus 100.

The position and orientation sensor 30 detects information relating to the position and the orientation of the display 1.

The position and orientation sensor 30 may consist of a plurality of sensors, including, for example, motion sensors such as a geomagnetic sensor, an acceleration sensor, a gyro sensor, and a global navigation satellite system (GNSS) sensor. With these sensors, the position and orientation sensor 30 is allowed to detect the position, the orientation, the acceleration, and the angular velocity of the display 1 as information relating to the position and the orientation of the display 1. For example, the position and orientation sensor 30 is capable of detecting the position and the orientation of the display 1 using the geomagnetic sensor and the GNSS sensor. The position and orientation sensor 30 is further capable of detecting the acceleration and the angular velocity of the display 1 using the acceleration sensor and the gyro sensor. The position and orientation sensor 30 outputs the results of detection to the information processing apparatus 100. In the case of using the visual simultaneous localization and mapping (SLAM) technology, which measures the position of the display based on an image from the camera 20, the camera 20 may be integrated in the position and orientation sensor 30.

The information processing apparatus 100 includes a central processing unit (CPU) as an arithmetic processor, a read only memory (ROM) as a memory device that stores, for example, computer programs and arithmetic parameters used by the CPU, and a random access memory (RAM) as a memory device that transiently stores parameters and the like that vary as appropriate with the CPU executed. The information processing apparatus 100 may be a built-in processor of the display 1.

Figure 2:
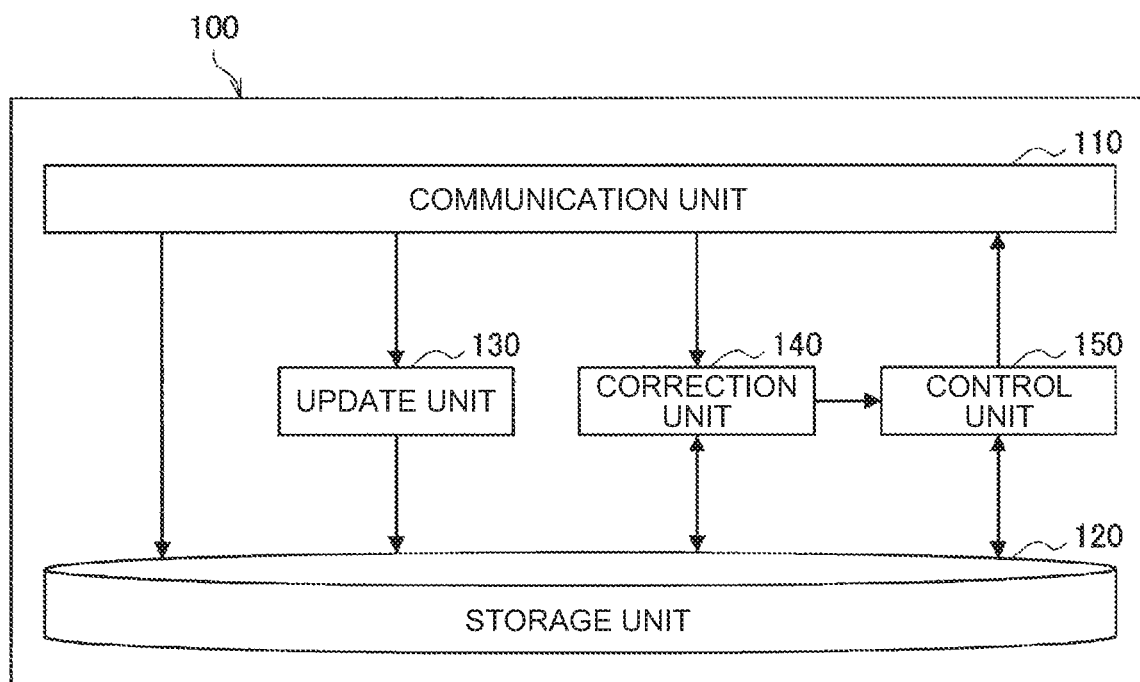
FIG. 2 is a block diagram that illustrates an example functional configuration of an information processing apparatus according to the embodiment.

FIG. 2 is a block diagram that illustrates an example functional configuration of the information processing apparatus 100 according to the embodiment.

The information processing apparatus 100 includes, for example, as illustrated in FIG. 2, a communication unit 110, a storage unit 120, an update unit 130, a correction unit 140, and a control unit 150.

The communication unit 110 of the information processing apparatus 100 communicates with an external device via a wired or wireless information network.

Specifically, the communication unit 110 receives information relating to the position and the orientation of the display 1 detected by the position and orientation sensor 30 from the position and orientation sensor 30 and outputs the information to the storage unit 120 and the update unit 130. The communication unit 110 receives a captured image by the camera 20 from the camera 20 and outputs the image to the correction unit 140. The communication unit 110 receives an operation instruction to control operation of the display 1 output from the control unit 150 and transmits the instruction to the display 1.

The storage unit 120 stores information used for various processing performed by the information processing apparatus 100.

Specifically, the storage unit 120 stores position and orientation information indicating the position and the orientation of the display 1 and information relating to a virtual object to be superimposing-displayed on the real world, as information used for display control performed by the control unit 150. The storage unit 120 further stores a marker image to be compared with an image captured by the camera 20, as information used by the correction unit 140 for correction processing.

The update unit 130 updates the position and orientation information of the display 1. Specifically, the update unit 130 repeatedly updates the position and orientation information stored in the storage unit 120 to maintain the information at the latest status. The position and orientation information of the display 1 may be considered as elements defined on, what is called, a global coordinate system associated with the real world. In this case, the superimposing-display of a virtual object on the real world can be controlled by using the relation between the position of the display 1 and a set position of the virtual object.

The correction unit 140 corrects the position and orientation information of the display 1. Specifically, the correction unit 140 corrects the position and orientation information stored in the storage unit 120 so as to cancel an error of the position and orientation information. In the specification, "correction" means modification of information that occurs with an instantaneous change (in other words, a comparatively large change) in the position or the orientation of the display 1. The position and orientation information before the correction may be referred to as first position and orientation information, and the position and orientation information after the correction may be referred to as second position and orientation information. The first position and orientation information and the second position and orientation information are information pieces non-continuous to each other.

The control unit 150 outputs an operation instruction to the communication unit 110 to control operation of the display 1. Thus, the superimposing-display of a virtual object on the real world by the display 1 is controlled. As described above, the control unit 150 controls the display 1 so that a virtual object is superimposed on the real world. In the specification, the control on the superimposing-display of a virtual object on the real world performed by the control unit 150 is referred to as display control.

The control unit 150 controls the display 1 to superimpose a virtual object associated with a set position, which is a place in the real world, on the real world, using the position and orientation information of the display 1. Specifically, the control unit 150 controls the display 1 to superimpose the virtual object, associated with the set position, on the real world, using the relation between the position and orientation information of the display 1 and the set position. This operation allows the virtual object to be superimposed on the associated set position, without referring to the position and the orientation of the display 1.

The display control performed by the information processing apparatus 100 is applied to, for example, an application of navigation.

Figure 3:
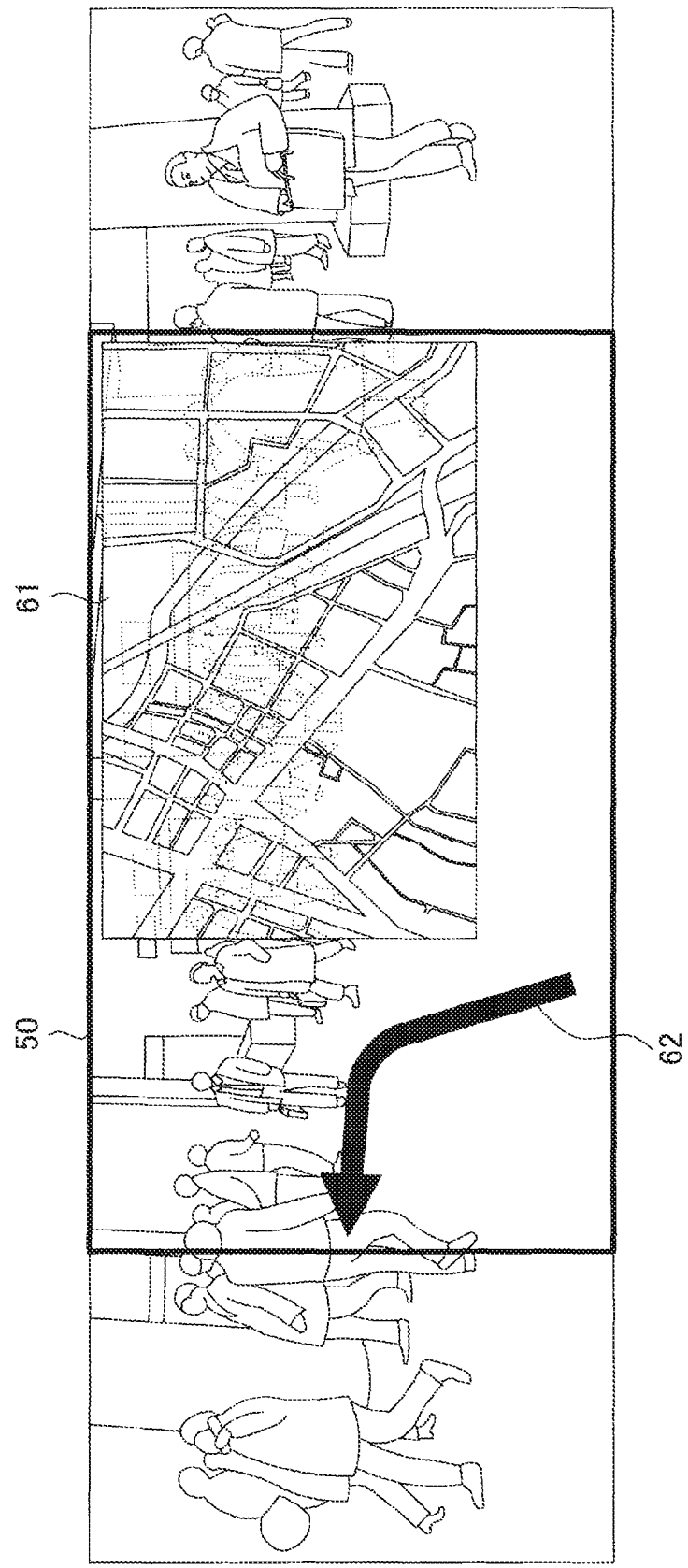
FIG. 3 is an illustrative drawing that illustrates an example display image when an application of navigation is executed.
Figure 4:
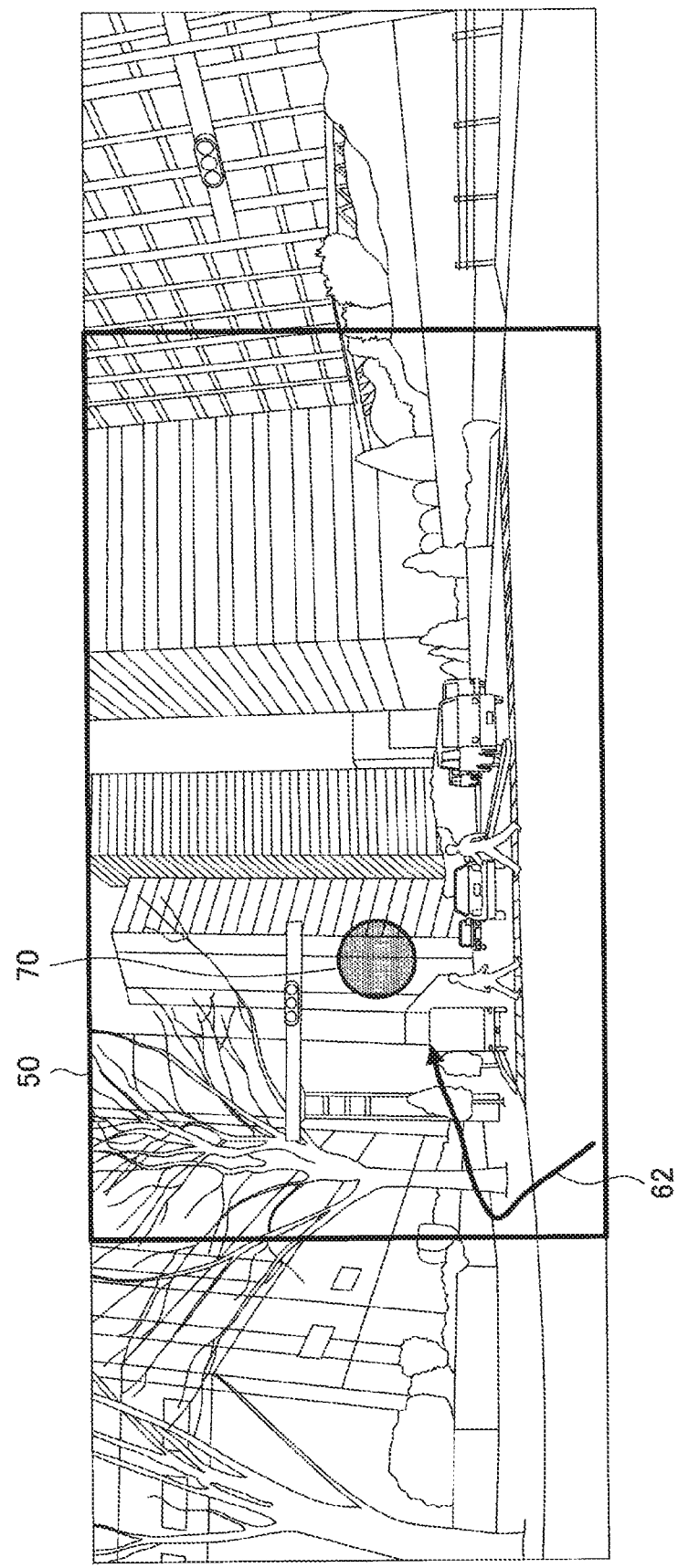
FIG. 4 is another illustrative drawing that illustrates an example display image when an application of navigation is executed.

FIG. 3 and FIG. 4 are illustrative drawings that illustrate example display images by the display 1 when an application of navigation is executed. Specifically, FIG. 3 illustrates a scene viewed by a user wearing the display 1 and moving in a station yard. FIG. 4 illustrates another scene viewed by the user moving on the street at some time after the scene of FIG. 3. A display region 50 in FIG. 3 and FIG. 4 is a region on which the display 1 displays information and corresponds to an area in the user's field of view.

When the application of navigation is executed, as illustrated in FIG. 3, for example, a map image 61 is displayed in the display region 50 in response to operation of the user. The user is allowed to set a desired destination using the map image 61. When the user sets a destination, the display 1 displays a recommended route from the current location to the set destination. For example, the display 1 displays an arrow 62 indicative of the recommended route, as illustrated in FIG. 3 and FIG. 4.

When the user gets close to the destination, and the destination comes into the sight of the user, the display 1 superimposes and displays a virtual object 70 associated with the destination as a set position, on the destination, as illustrated in FIG. 4. The user therefore can easily recognize the location of the destination and smoothly arrive thereat.

In order to super impose the virtual object 70 on the destination without using the position or the orientation of the display 1, the image of the virtual object 70 is controlled with reference to the relation between the position and orientation information of the display 1 and the destination. Upon correction of the position and orientation information, the superimposed position of the virtual object 70 may be changed with the correction. When the position and orientation information is corrected from first position and orientation information to second position and orientation information that is non-continuous to the first position and orientation information, the control unit 150 of the information processing apparatus 100 according to the embodiment controls the display 1 to perform transition display that indicates transition of display conditions from a first display condition, which displays the virtual object 70 based on the first position and orientation information, to a second display condition based on the second position and orientation information. This manner facilitates use of the AR technology.

In the specification, the display control of the control unit 150 is applied to the display 1 as an optical see-through HMD; however, a mobile body to which the display control of the control unit 150 is applicable is not limited to this example.

The display control of the control unit 150 may be applied to a video see-through HMD. In this case, the control unit 150 controls the video see-through HMD to superimposing-display a virtual object on the real world in an image. The control unit 150 controls the video see-through HMD, or a mobile body, to superimpose the virtual object associated with a set position in the real world, on the real world in the image, with reference to the position and orientation information of the HMD.

The display control by the control unit 150 may be applied to an information processing terminal, such as a smartphone and a tablet terminal, that captures image of the real world and superimposes and displays a virtual object on the captured image of the real world. In this case, the control unit 150 performs the display control on the information processing terminal to superimpose the virtual object on the captured real world. The control unit 150 controls the information processing terminal as a mobile body to superimpose a virtual object associated with a set position in the real world, on the real world in the image, referring to the position and orientation information of the information processing terminal.

For example, the display control of the control unit 150 may be applied to a display of a system that implements the superimposing-display of a virtual object on the real world using a car, an aircraft, a drone, or other mobile bodies. Specifically, this type of display may include, for example, a head-up display (HUD) that superimposes and displays a virtual object on the real world in the image in the field of view of a passenger on a vehicle or an aircraft, and include a display that superimposes and displays a virtual object on the real world in an image obtained by a drone that captures the real world. In this case, in the display control, the control unit 150 controls the superimposing-display of a virtual object on the real world by the display of the system described above. Specifically, the control unit 150 controls the display of the system to superimpose a virtual object, associated with a set position in the real world, on the real world, with reference to the position and orientation information of the mobile body such as a car, an aircraft, and a drone.

2. Operation of Information Processing Apparatus

Operation of the information processing apparatus 100 according to the embodiment will now be described with reference to FIG. 5 through FIG. 22.

2-1. General Flow of Processing

A general flow of processing performed by the information processing apparatus 100 according to the embodiment will now be described with reference to FIG. 5.

Figure 5:
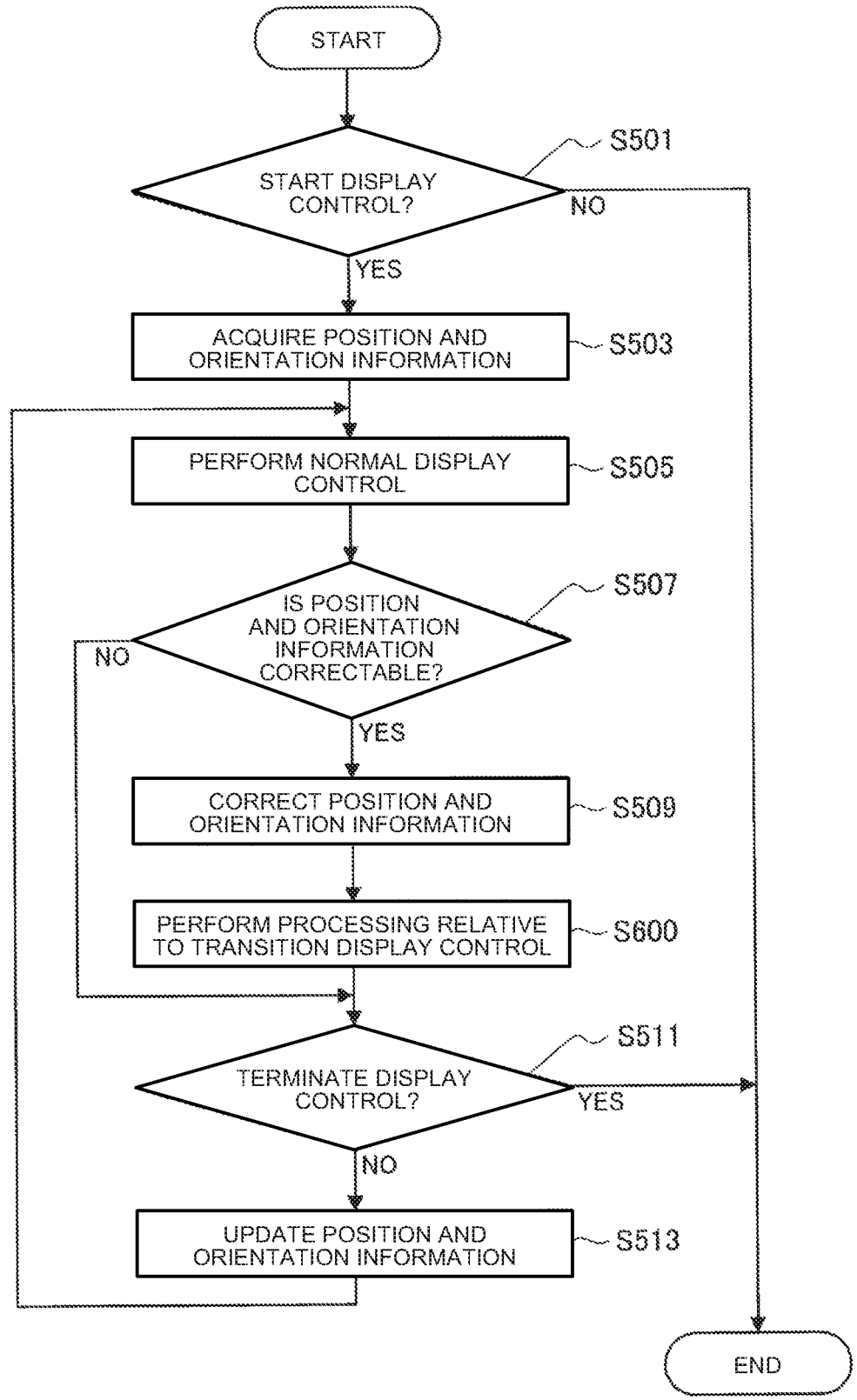
FIG. 5 is a flowchart that illustrates an example general flow of processing performed by the information processing apparatus according to the embodiment.

FIG. 5 is a flowchart that illustrates an example general flow of processing performed by the information processing apparatus 100 according to the embodiment. For example, the processing flow of FIG. 5 is constantly repeated. At the start of the processing flow of FIG. 5, the display control is yet to be started.

Upon start of the processing flow of FIG. 5, at Step S501, the information processing apparatus 100 determines whether to start the display control. If the information processing apparatus 100 determines to start the display control (Yes at Step S501), the processing proceeds to Step S503. If the information processing apparatus 100 determines not to start the display control (No at Step S501), the processing flow of FIG. 5 is terminated.

For example, the information processing apparatus 100 determines to start the display control, when the above navigation application is launched in response to the user's operation. A trigger used for determining when to start the display control is not limited to this example. The information processing apparatus 100 may determine to start the display control, upon start of another application different from the navigation application. The information processing apparatus 100 may determine to start the display control, when the power of the display 1 is turned on.

The following description mainly explains the processing relating to the superimposing-display of the virtual object 70 when the navigation application described above is executed. Without being limited to this example, the information processing apparatus 100 is allowed to operate to superimposing-display a virtual object in the similar fashion even in a different circumstance (for example, when another application is executed).

At Step S503, the communication unit 110 acquires the position and orientation information of the display 1.

For example, the communication unit 110 receives results of detection relating to the position and the orientation of the display 1 from the position and orientation sensor 30, as initial values of the position and orientation information, and stores the results in the storage unit 120.

At Step S505, the control unit 150 performs normal display control.

The normal display control of the control unit 150 is to cause the display 1 to display the virtual object 70 with reference to the relation between the position and orientation information of the display 1 and a set position of the virtual object 70.

For example, the control unit 150 performs the normal display control to make a superimposed position, on which the virtual object 70 is superimposed, of the virtual object 70 relative to the actual position and orientation of the display 1, consistent to a set position of the virtual object 70 relative to the position and the orientation of the display 1 indicated by the position and orientation information. This control can make the superimposed position of the virtual object 70 and the set position of the virtual object 70 consistent to each other. If the superimposed position of the virtual object 70 is located in the display region 50, the virtual object 70 is accordingly displayed in the display region 50 of the display 1. If the superimposed position of the virtual object 70 is outside the display region 50, the virtual object 70 is not displayed in the display region 50 of the display 1.

The superimposed position is, specifically, a position where the virtual object 70 is superimposed on the real world (a location of the virtual object 70 plotted on the real world). The set position is a position designated in advance in the real world in a manner associated with the virtual object 70. For example, in the navigation application, the set position of the virtual object 70 is a destination indicated by the virtual object 70. Information of the set position is stored, for example, in the storage unit 120.

If the position and the orientation of the display 1 indicated by the position and orientation information is consistent to the actual position and orientation of the display 1, the superimposed position of the virtual object 70 is consistent to the set position. As described above, however, a detection error or a similar error of the position and orientation sensor 30 may cause an error in the position and orientation information (in other words, a difference between the position and the orientation of the display 1 indicated by the position and orientation information and the actual position and orientation of the display 1). Such an error in the position and orientation information may cause a corresponding deviation between the superimposed position and the set position of the virtual object 70. Correction of the position and orientation information is therefore performed to reduce the deviation between the superimposed position and the set position of the virtual object 70, as described later.

At Step S507, the information processing apparatus 100 determines whether the position and orientation information of the display 1 is correctable. If the position and orientation information is determined to be correctable (Yes at Step S507), the processing proceeds to Step S509. If the position and orientation information is determined not to be correctable (No at Step S507), the processing proceeds to Step S511.

For example, the processing to correct the position and orientation information of the display 1 is performed, as described later, by comparing a marker on a marker image stored in the storage unit 120 with a corresponding marker on an image of the real world from the camera 20. The information processing apparatus 100 determines the position and orientation information to be correctable, upon acquisition of an image including the marker from the camera 20.

At Step S509, the correction unit 140 corrects the position and orientation information of the display 1. Specifically, the position and orientation information of the display 1 is corrected from first position and orientation information to second position and orientation information that is non-continuous to the first position and orientation information.

For example, the correction unit 140 corrects the position and orientation information by comparing the image of the marker from the camera 20 with the marker image. The marker image is an image captured by the camera 20 with the display 1 fixed at a certain position in a certain orientation. The marker image is stored in advance, for example, in the storage unit 120. The marker image is associated with a specific position and orientation. Specifically, the storage unit 120 stores in advance a plurality of marker images of the display 1 set in various positions and orientations. The marker image may include a physical object referred to as a marker or may have no such objects. As the relation on the association between the marker image and the specific position and orientation, a relation that is dynamically created by the information processing apparatus 100 may be used, or another relation that is created in advance by another system may be used, or a combination of both relations may be used.

The correction unit 140 identifies the actual position and orientation of the display 1 by comparing the position, the orientation, and the scale of a marker in an image from the camera 20 with the position, the orientation, and the scale of a maker in the marker image. The correction unit 140 corrects the position and orientation information stored in the storage unit 120 to information indicative of the actual position and the orientation of the display 1 specified as above. This correction process cancels an error in the position and orientation information, which may occur due to a detection error or the like of the position and orientation sensor 30. For example, if the error in the position and orientation information, detected by the position and orientation sensor 30, is larger than a threshold, the correction unit 140 may correct the position and orientation information. The threshold is set, for example, to appropriately reduce the deviation between the superimposed position and the set position of the virtual object 70. After correction of the position and orientation information, the position and orientation information right before the correction may be stored in the storage unit 120 as a history.

At Step S600, the control unit 150 performs processing relating to transition display control.

In the transition display control, the control unit 150 controls the display 1 to perform transition display indicative of transition of display conditions from a first display condition that displays the virtual object 70 based on the first position and orientation information, which is position and orientation information before correction, to a second display condition that displays the object based on the second position and orientation information, which is the information after correction. In the transition display control, the display 1 is controlled to indicate that the manner of display in the normal display control has changed from a condition in which the object is displayed based on the first position and orientation information, or the position and orientation information before correction, to a condition in which the object is displayed based on the second position and orientation information, or the information and orientation information after correction. The processing flow of the transition display control will be described later in detail.

At Step S511, the information processing apparatus 100 determines whether to terminate the display control. If the information processing apparatus 100 determines to terminate the display control (Yes at Step S511), the processing flow of FIG. 5 is terminated. If the information processing apparatus 100 determines not to terminate the display control (No at Step S511), the processing proceeds to Step S513.

For example, the information processing apparatus 100 determines to terminate the display control, when the above navigation application is terminated in response to the user's operation. A trigger used to determine when to terminate the display control is not limited to this example. For example, the information processing apparatus 100 may determine to terminate the display control when another application different from the navigation application is terminated. The information processing apparatus 100 may determine to terminate the display control when the power of the display 1 is turned off.

At Step S513, the update unit 130 updates the position and orientation information of the display 1.

For example, the update unit 130 updates the position and orientation information stored in the storage unit 120, using the acceleration and the angular velocity of the display 1 detected by the position and orientation sensor 30.

The update unit 130 may update the position and orientation information of the display 1, based on a change in the position of a feature point in an image captured by the camera 20. For example, a technology called simultaneous localization and mapping (SLAM) enables such an update of the position and orientation information using images from the camera 20. The update unit 130 may update the position and orientation information of the display 1, based on the position and orientation of the display 1 detected by the position and orientation sensor 30. In any of these cases, errors in the position and orientation information may occur.

The processing returns to Step S505, and the normal display control is performed based on the updated position and orientation information.

2-2. Transition Display Control

As illustrated in FIG. 6 to FIG. 22, processing relating to the transition display control is performed by the control unit 150 of the information processing apparatus 100 according to the embodiment. The processing relating to the transition display control, for example, corresponds to the processing at Step S600 in the processing flow of FIG. 5.

Figure 6:
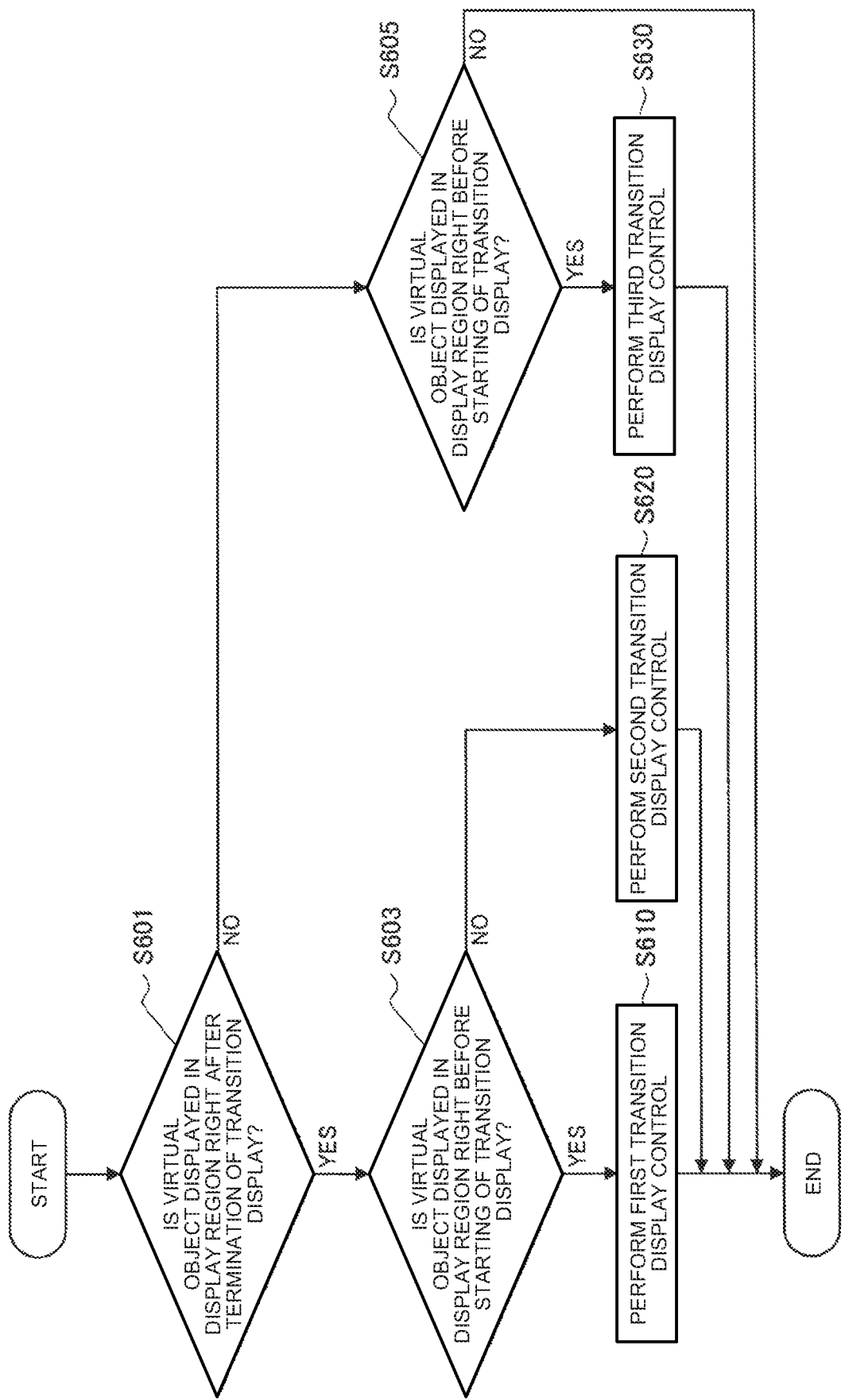
FIG. 6 is a flowchart that illustrates an example flow of processing relating to transition display control performed by a control unit of the information processing apparatus according to the embodiment.

FIG. 6 illustrates a processing flow relating to the transition display control performed by the control unit 150 of the information processing apparatus 100 according to the embodiment.

FIG. 6 is a flowchart that illustrates an example flow of the processing relating to the transition display control performed by the control unit 150 of the information processing apparatus 100 according to the embodiment.

The transition display control has a difference between processing performed based on whether the virtual object 70 is displayed in the display region 50 right before the start of the transition display and processing performed based on whether the virtual object 70 is displayed in the display region 50 right after the termination of the transition display.

Upon start of the processing flow in FIG. 6, at Step S601, the control unit 150 determines whether the virtual object 70 is displayed in the display region 50 right after the termination of the transition display (in other words, when the normal display control is performed right after the correction of the position and orientation information). If the virtual object 70 is determined to be displayed in the display region 50 right after the termination of the transition display (Yes at Step S601), the processing proceeds to Step S603. If the virtual object 70 is determined not to be displayed in the display region 50 right after the termination of the transition display (No at Step S601), the processing proceeds to Step S605.

For example, the control unit 150 is allowed to determine whether the virtual object 70 is displayed in the display region 50 right after the termination of the transition display, based on the set position of the virtual object 70 relative to the position and the orientation of the display 1 indicated by the position and orientation information right after correction.

At Step S603, the control unit 150 determines whether the virtual object 70 is displayed in the display region 50 right before the start of the transition display (in other words, when the normal display control is performed right before the correction of the position and orientation information). If the virtual object 70 is determined to be displayed in the display region 50 right before the start of the transition display (Yes at Step S603), the processing proceeds to Step S610. If the virtual object 70 is determined not to be displayed in the display region 50 right before the start of the transition display (No at Step S603), the processing proceeds to Step S620.

For example, the control unit 150 is allowed to determine whether the virtual object 70 is displayed in the display region 50 right before the start of the transition display, based on the set position of the virtual object 70 relative to the position and the orientation of the display 1 indicated by the position and orientation information right before correction.

At Step S610, the control unit 150 performs first transition display control. The processing flow of the first transition display control will be described later in detail.

At Step S620, the control unit 150 performs second transition display control. The processing flow of the second transition display control will also be described later in detail.

At Step S605, the control unit 150 determines whether the virtual object 70 is displayed in the display region 50 right before the start of the transition display. If the virtual object 70 is determined to be displayed in the display region 50 right before the start of the transition display (Yes at Step S605), the processing proceeds to Step S630. If the virtual object 70 is determined not to be displayed in the display region 50 right before the start of the transition display (No at Step S605), the processing of FIG. 6 is terminated.

At Step S630, the control unit 150 performs third transition display control. The processing flow of the third transition display control will be described later in detail.

Each type of the first transition display control, the second transition display control, and the third transition display control, performed based on the results of determination at determination processing of Step S601, S603, and S605, is described in detail.

2-2-1. First Transition Display Control

As illustrated in FIG. 7 to FIG. 13, the first transition display control performed by the control unit 150 of the information processing apparatus 100 according to the embodiment will be described in detail.

Figure 7:
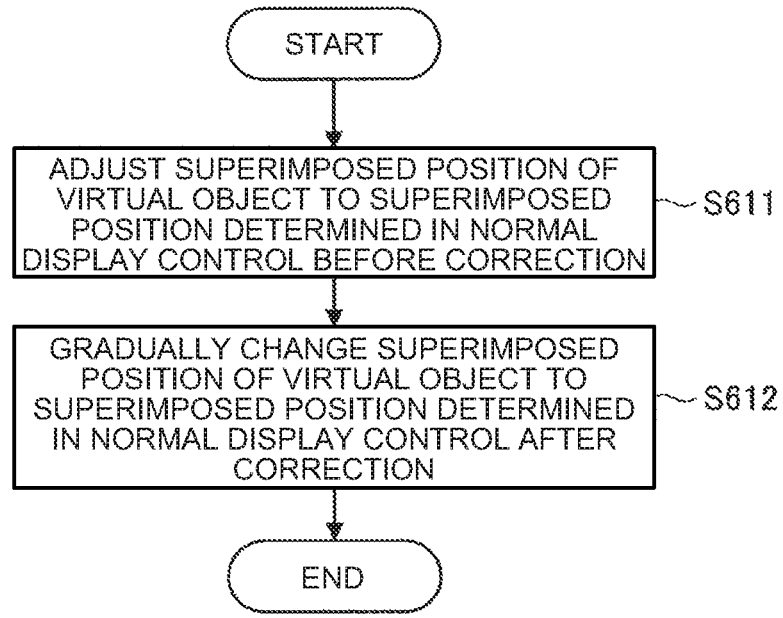
FIG. 7 is a flowchart that illustrates an example flow of a first example of first transition display control performed by the control unit of the information processing apparatus according to the embodiment.

FIG. 7 is a flowchart that illustrates a first example flow of the first transition display control performed by the control unit 150 of the information processing apparatus 100 according to the embodiment.

Upon start of the processing flow of FIG. 7, at Step S611, the control unit 150 adjusts the superimposed position of the virtual object 70 at a superimposed position designated in the normal display control before correction of the position and orientation information.

Figure 8:
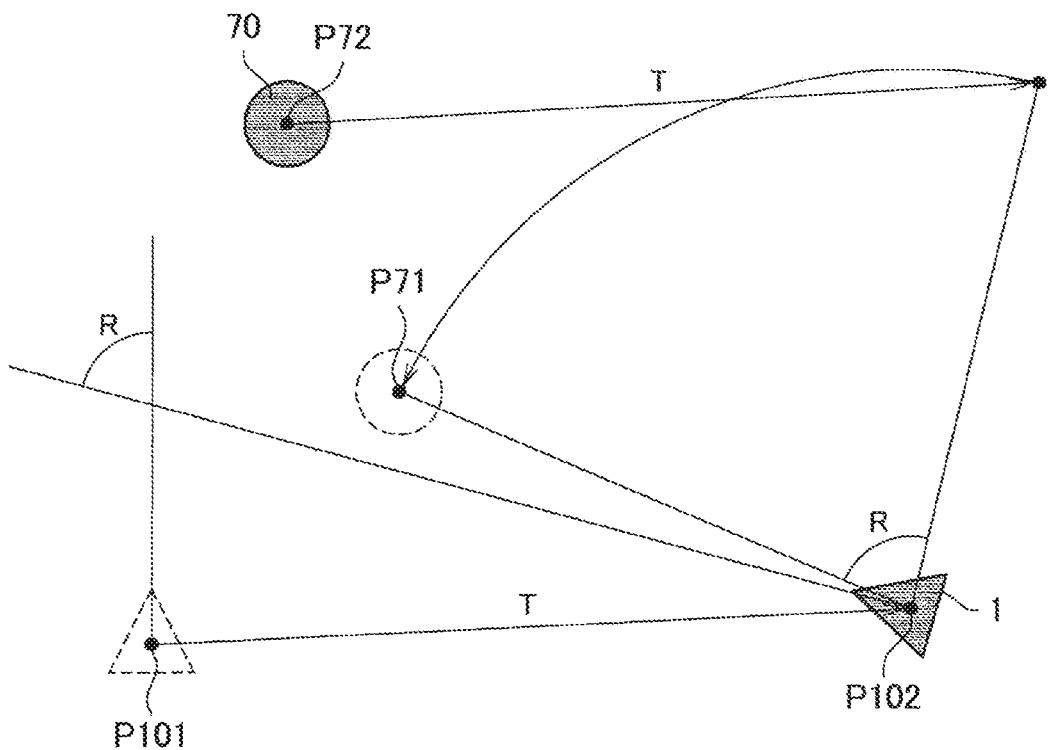
FIG. 8 is a schematic drawing that illustrates example relation between a set position of the virtual object and the position of the display according to a position and orientation information before and after correction.

FIG. 8 is a schematic drawing that illustrates example relation between a set position P72 of the virtual object 70 and the position of the display 1, indicated by the position and orientation information pieces before and after correction. In the example of FIG. 8, a position P101 is a position where the display 1 is located according to the position and orientation information right before correction, and a position P102 is a position where the display 1 is located according to the position and orientation information right after correction.

Specifically, the display 1 whose position is indicated by the position and orientation information moves from the position P101 to the position P102 by a distance T upon correction. The display 1, whose orientation is indicated by the position and orientation information, turns an angle R upon correction.

In the example of FIG. 8, the control unit 150 performs the normal display control right before correction with reference to the set position P72, which is determined in relation to the position P101 and the orientation of the display 1 indicated by the position and orientation information right before correction. The actual position and orientation of the display 1 correspond to the position P102 and the orientation of the display 1 indicated by the position and orientation information right after correction. The superimposed position of the virtual object 70 in the normal display control before correction is therefore a position P71 that is different from the set position P72.

The position P71 as the superimposed position in the normal display control before correction is a position by moving the set position P72 by a distance T in the same direction as the direction from the position P101 toward the position P102 and then turning the position by an angle R about the position P102, in the same direction as the display 1 is rotated upon correction of the orientation of the display 1.

In the example of FIG. 8, the control unit 150 calculates the position P71 as the superimposed position of the virtual object 70 in the normal display control before correction. The control unit 150 adjusts the superimposed position of the virtual object 70 to the calculated position P71. Specifically, the display control is performed to make the superimposed position of the virtual object 70, determined relative to the actual position and the orientation of the display 1, consistent to the position P71 determined relative to the position P102 and the orientation of the display 1 indicated by the position and orientation information right after correction.

The control unit 150 thus can specify the superimposed position of the virtual object 70 in the normal display control before correction, with reference to the set position of the virtual object 70 and to a change in the position and the orientation of the display 1, indicated by the position and orientation information, before and after correction. In other examples of transition display control described below, the control unit 150 is similarly capable of specifying the superimposed position in the normal display control before correction.

At Step S612, the control unit 150 gradually (for example, stepwise) changes the superimposed position of the virtual object 70 to a superimposed position indicated by the position and orientation information in the normal display control after correction.

In the example of FIG. 8, the control unit 150 performs the normal display control after correction using the set position P72 determined relative to the position and the orientation of the display 1 indicated by the position and orientation information after correction. The superimposed position of the virtual object 70 is therefore consistent to the set position P72 in the normal display control after the correction.

In the example of FIG. 8, the control unit 150 changes the superimposed positions of the virtual object 70 stepwise from the position P71 as a superimposed position in the normal display control before correction, to the set position P72 as a superimposed position in the normal display control after correction. The stepwise change of the superimposed position can be realized by performing the display control so as to make the superimposed position of the virtual object 70 relative to the actual position and orientation of the display 1 consistent to each position between the position P71 in relation to the position and the orientation of the display 1 indicated by the position and orientation information after correction and the set position P72 stepwise.

In this manner, the control unit 150 can specify the set position of the virtual object 70 as a superimposed position of the virtual object 70 in the normal display control after correction. In other examples of transition display control described as below, the control unit 150 can similarly specify the set position of the virtual object 70 as a superimposed position in the normal display control after correction.

The control unit 150 can control the speed of change in the superimposed position of the virtual object 70 using various parameters. In other examples of transition display control described as below, the control unit 150 can similarly control the speed of change in the superimposed position of the virtual object 70.

For example, the control unit 150 may control the speed of change in the superimposed position of the virtual object 70, based on the motion of the display 1. Specifically, the control unit 150 may increase the speed of change in the superimposed position of the virtual object 70 with an increase in the speed of change in the position or the orientation of the display 1. In other words, the display 1 is controlled such that, when the speed of change in the position or the orientation of the display 1 is a first speed of change, the speed of change in the superimposed position of the virtual object 70 is larger than that when the speed of change in the position or the orientation of the display 1 is a second speed of change that is smaller than the first speed of change. The above-described change in the position or the orientation of the display 1 includes changes in the travel speed and the rotational speed of the user (the display 1).

The control unit 150 may control the speed of change in the superimposed position of the virtual object 70, based on whether the virtual object 70 is a moving object (moving image). If the virtual object 70 is a moving object, the control unit 150 may increase the speed of change in the superimposed position of the virtual object 70, in comparison with a case when the virtual object 70 is a non-moving object (still image). The moving object may be an animated image and any object that moves under certain conditions.

Figure 9:
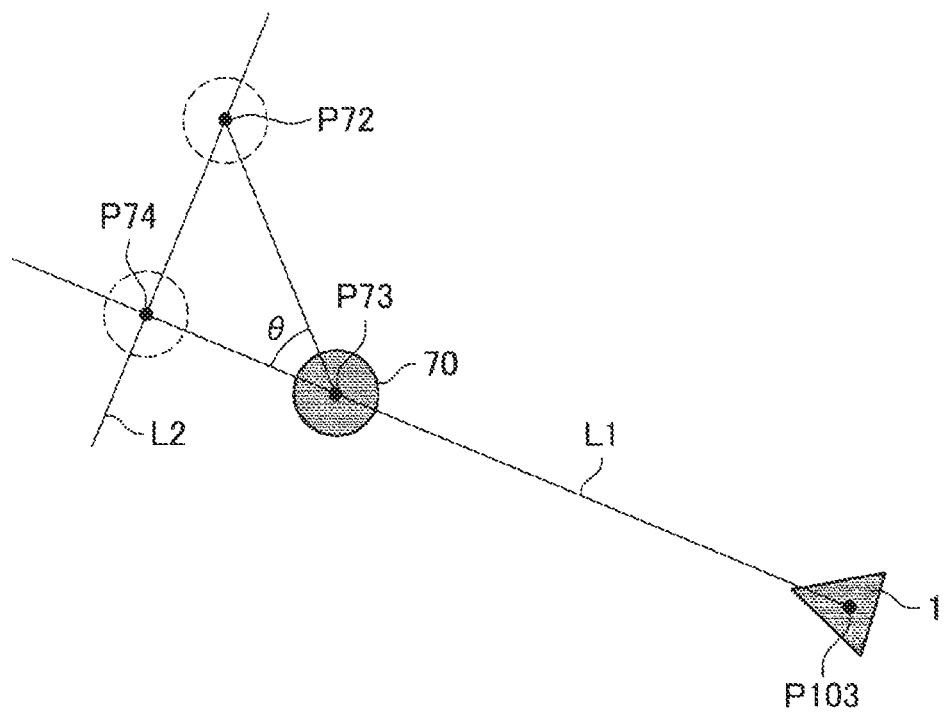
FIG. 9 is a schematic drawing to illustrate processing of adjusting the superimposed position in a direction along a straight line connecting the position of the display and the superimposed position of the virtual object.

For example, the control unit 150 may change the superimposed position of the virtual object 70 preferentially in a direction along a straight line connecting the position of the display 1 and the superimposed position of the virtual object 70. FIG. 9 is a schematic drawing to explain the processing of adjusting the superimposed position of the virtual object 70 in a direction along the straight line connecting the position of the display 1 and the superimposed position. For example, as illustrated in FIG. 9, when the superimposed position of the virtual object 70 is on a position P73 and the display 1 is located at a position P103 according to the position and orientation information, the control unit 150 may change the superimposed position preferentially to a position P74 along a straight line L1 connecting the position P103 and the position P73. The position P74 is located at an intersection of the straight line L1, connecting the position P103 and the position P73, and a straight line L2 orthogonal to the straight line L1 and passing through the set position P72. In other words, the position P74 is a point closest to the set position P72, on the straight line L1. The control unit 150 may change the superimposed position preferentially along the straight line L1 only when an angle $\theta$ between the straight lines L1 and L2 is smaller than a predetermined angle (for example, 30 degree).

The control unit 150 may maintain the speed of change in the superimposed position of the virtual object 70 to be constant. In this case, the superimposed position of the virtual object 70 varies over time.

The processing of FIG. 7 is terminated with this step.

Figure 10:
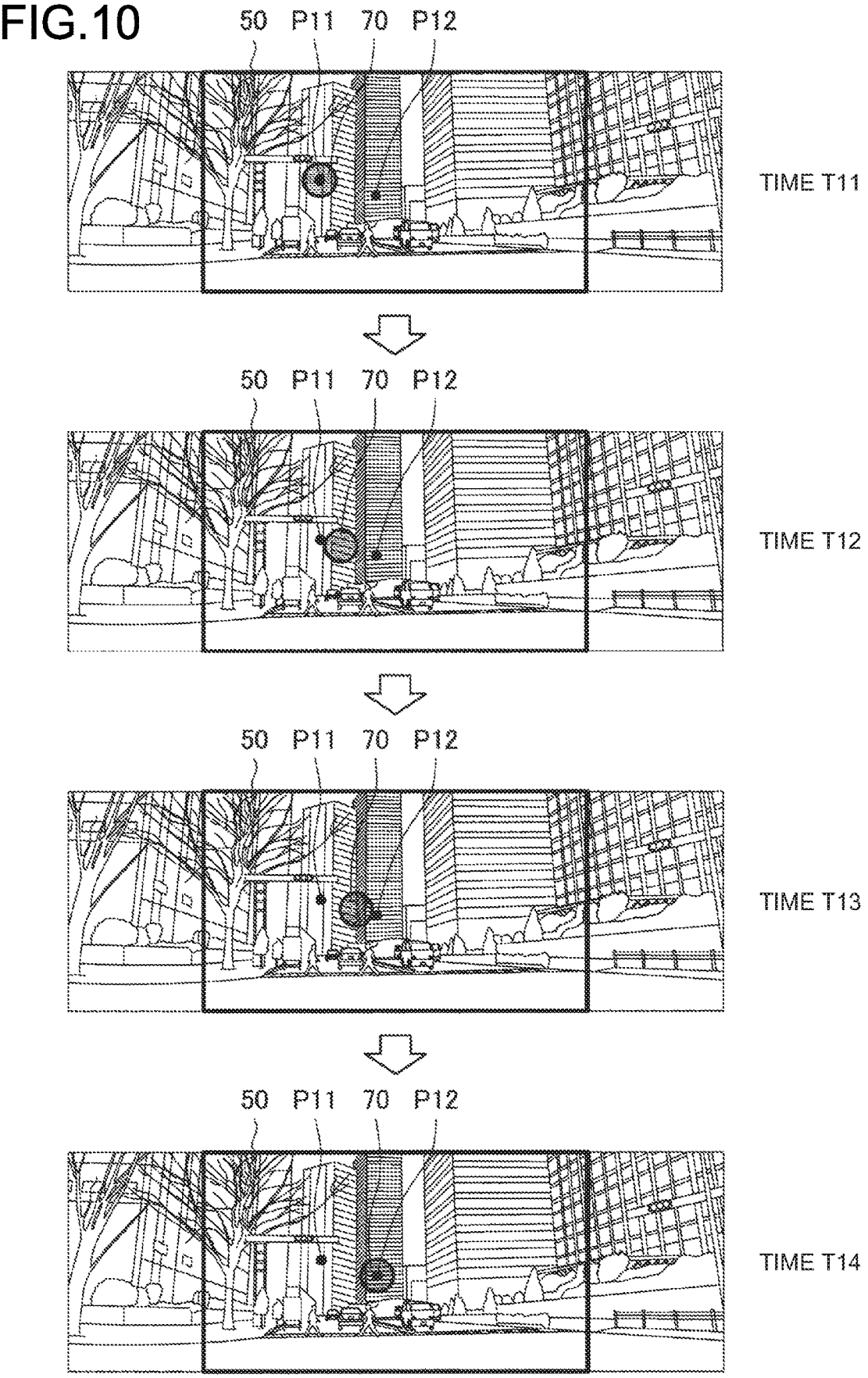
FIG. 10 is an illustrative drawing that indicates an example of display transition in the first example of the first transition display control.

FIG. 10 is an illustrative drawing that indicates an example of display transition in the first example of the first transition display control. FIG. 10 depicts a position P11 as the superimposed position in the normal display control before correction and a set position P12 as the superimposed position in the normal display control after correction.

As described above, the first transition display control is executed when the virtual object 70 is determined to be displayed in the display region 50 right before the start of and right after the termination of transition display. The position P11 as the superimposed position in the normal display control before correction, and the set position P12 as the superimposed position in the normal display control after correction, are both therefore allowed to be located in the display region 50.

For example, when the first example of the first transition display control is executed at a time T11, the superimposed position of the virtual object 70 is adjusted to the position P11. As illustrated in FIG. 10, the virtual object 70 is therefore displayed on the position P11 in the display region 50 as is right before the transition display control. The superimposed position of the virtual object 70 is changed stepwise in the display region 50, from the position P11 to the set position P12.

Specifically, at a time T12 later than the time T11, the superimposed position of the virtual object 70 approaches the set position P12 in comparison with the position at the time T11. At a time T13 later than the time T12, the virtual object 70 is superimposed on the superimposed position of the virtual object 70 further approaches the set position P12 in comparison with the position at the time T12. At a time T14 when the virtual object 70 overlaps the set position P12, the transition display control is switched to the normal display control.

In this manner, the first example of the first transition display control causes the virtual object 70, having been displayed on the position P11 in the display region 50 before the position and orientation information is corrected, to move stepwise in the display region 50 from the position P11 to the set position P12 upon correction of the position and orientation information.

Figure 11:
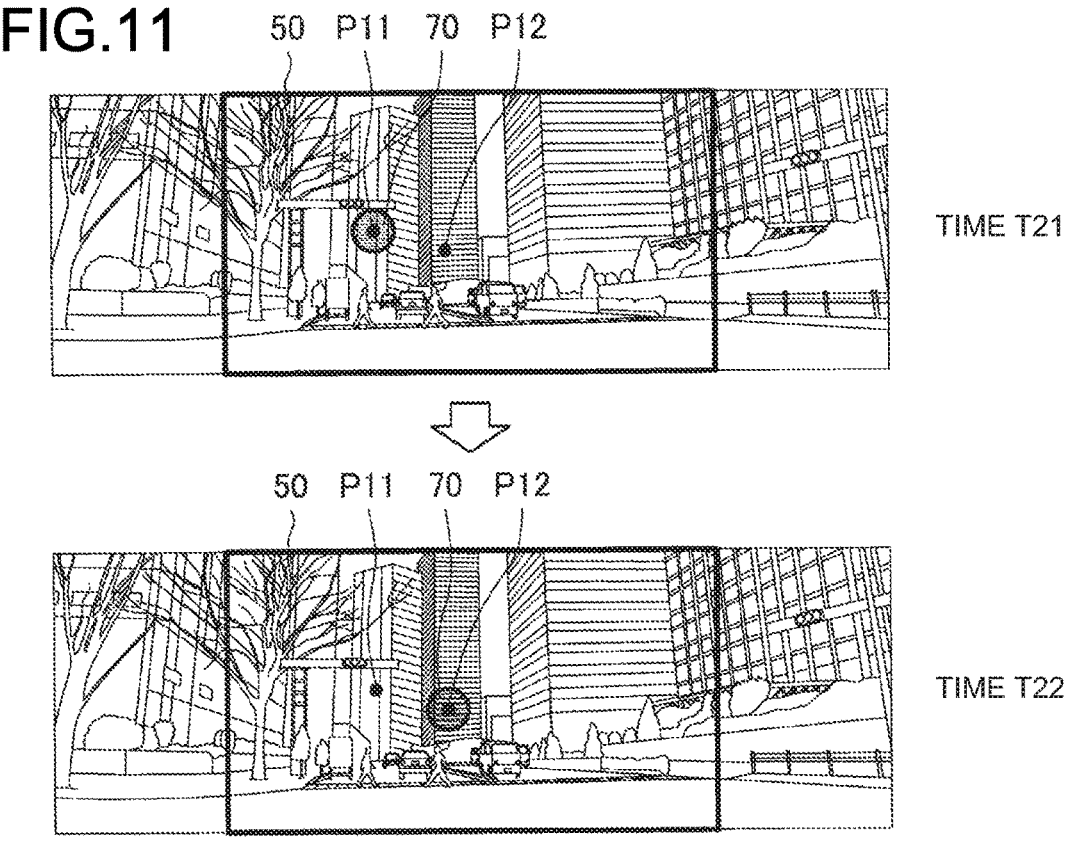
FIG. 11 is an illustrative drawing that indicates an example of display transition controlled by an information processing apparatus according to a reference example.

FIG. 11 is an illustrative drawing that indicates an example of display transition by display control performed by an information processing apparatus according to a reference example. The information processing apparatus according to the reference example is different from the information processing apparatus 100 according to the embodiment in that, when position and orientation information is corrected, the processor continues normal display control, instead of performing transition display control. FIG. 11 illustrates a detailed example of display transition according to the reference example in which the virtual object 70 is displayed in the display region 50 in the normal display control right before and right after correction of the position and orientation information. In the reference example, as illustrated in FIG. 11, the virtual object 70 displayed on the position P11 in the display region 50 at a time T21 before correction of the position and orientation information suddenly moves to the set position P12 in the display region 50 at a time T22 upon correction of the position and orientation information.

In the reference example, in response to correction of the position and orientation information, the virtual object 70 in the display region 50 suddenly moves. Correction of the position and orientation information therefore causes the user to feel uncomfortable. The information processing apparatus 100 according to the embodiment performs the first example of the first transition display control to prevent the virtual object 70 displayed in the display region 50 from making a sudden move upon correction of the position and orientation information. The information processing apparatus 100 thus can prevent the user from feeling uncomfortable upon correction of the position and orientation information.

Figure 12:
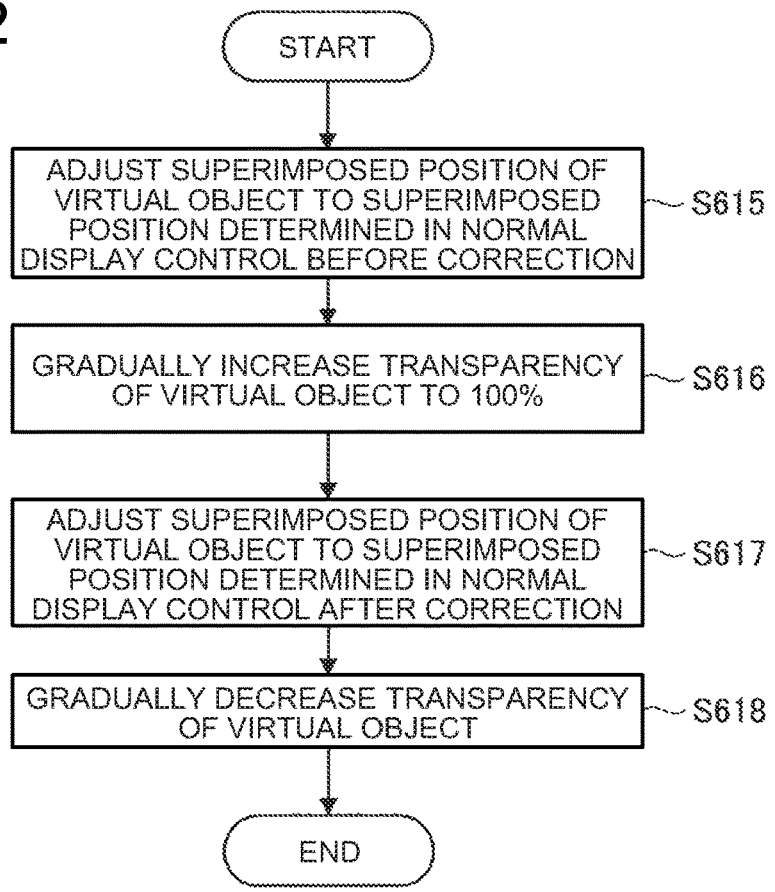
FIG. 12 is a flowchart that illustrates an example flow of a second example of the first transition display control performed by the control unit of the information processing apparatus according to the embodiment.

FIG. 12 is a flowchart that illustrates an example flow of a second example of the first transition display control performed by the control unit 150 of the information processing apparatus 100 according to the embodiment.

Upon start of the processing flow of FIG. 12, at Step S615, the control unit 150 adjusts the superimposed position of the virtual object 70 to a superimposed position determined based on the position and orientation information before correction in the normal display control.

At Step S616, the control unit 150 gradually (for example, stepwise) increases the transparency of the virtual object 70 up to 100%.

Specifically, transparency of 100% is the highest level of transparency. When the transparency of the virtual object 70 is 100%, the virtual object 70 is not displayed even when the superimposed position of the virtual object 70 is in the display region 50.

At Step S617, the control unit 150 performs the normal display control to adjust the superimposed position of the virtual object 70 on a superimposed position determined based on the position and orientation information after correction.

At Step S618, the control unit 150 gradually (for example, stepwise) decreases the transparency of the virtual object 70.

The processing of FIG. 12 is terminated with this step.

Figure 13:
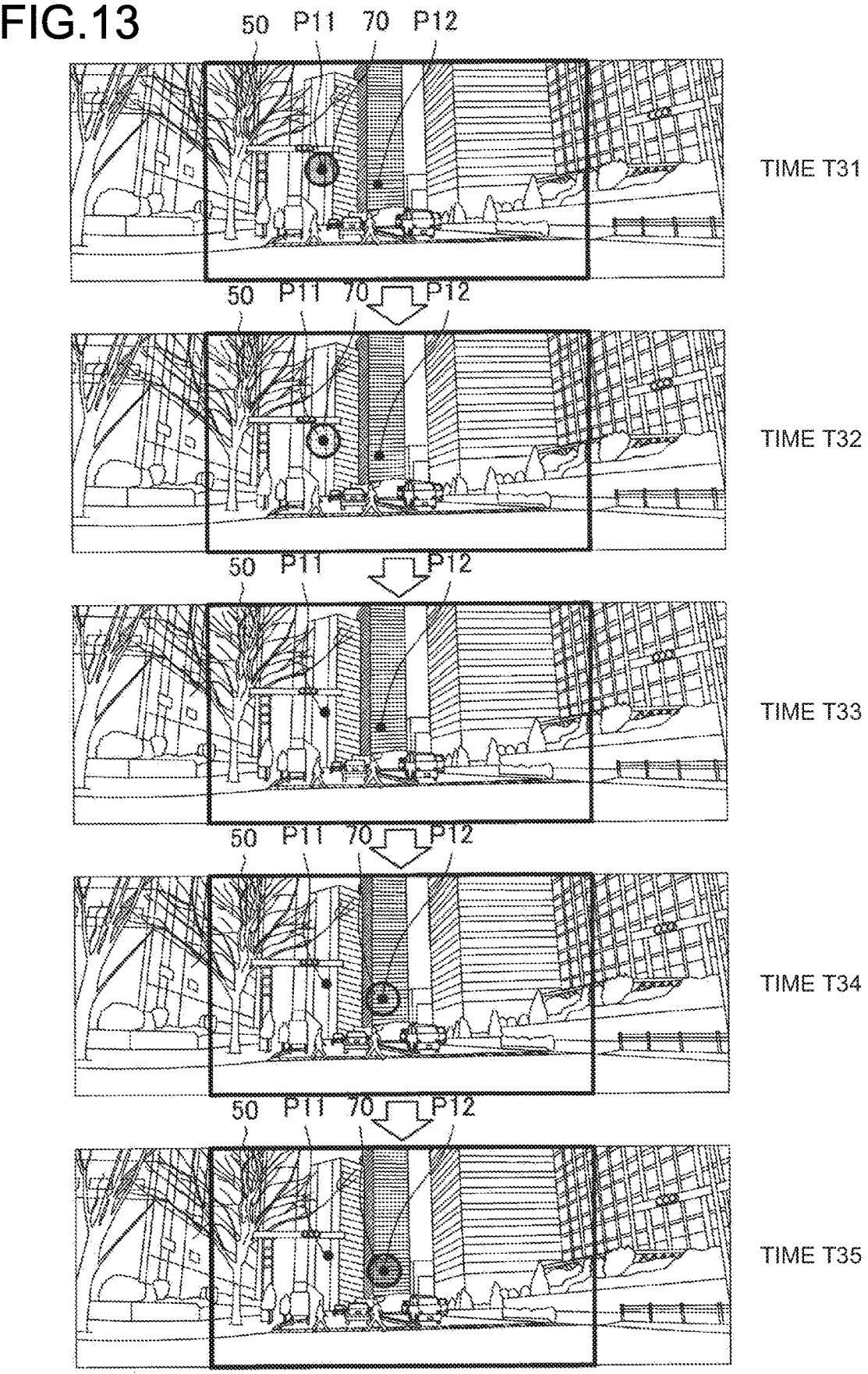
FIG. 13 is an illustrative drawing that indicates an example of display transition in the second example of the first transition display control.

FIG. 13 is an illustrative drawing that indicates an example of display transition in the second example of the first transition display control. As with FIG. 10, FIG. 13 depicts the position P11 as the superimposed position in accordance with the normal display control before correction and the set position P12 as the superimposed position in accordance with the normal display control after correction.

For example, when the second example of the first transition display control is executed at a time T31, the superimposed position of the virtual object 70 is adjusted to the position P11. As illustrated in FIG. 13, the virtual object 70 is therefore superimposed and displayed on the position P11 in the display region 50 as is right before the transition display. The transparency of the virtual object 70 is increased stepwise up to 100%. Specifically, the transparency of the virtual object 70 at a time T32 later than the time T31 is increased in comparison with the time T31. The transparency of the virtual object 70 is further increased and becomes 100% at a time T33. The virtual object 70 accordingly becomes non-displayed.

At the time T33, the superimposed position of the virtual object 70 is adjusted to the set position P12. The transparency of the virtual object 70 then gets decreased stepwise. The transparency of the virtual object 70 at a time T34 later than the time T33 is decreased in comparison with the time T33. With a further decrease in the transparency of the virtual object 70, the virtual object 70 is displayed on the set position P12 at a time T35. The transition display control is switched to the normal display control.

In this manner, the second example of the first transition display control is performed, whereby the virtual object 70, having been displayed on the position P11 in the display region 50 before correction of the position and orientation information, is once faded out and then the virtual object 70 is faded in at the set position P12 in the display region 50, when the position and orientation information is corrected.

As with the first example of the first transition display control, the second example can prevent the user from feeling uncomfortable due to the sudden move of the superimposed position of the virtual object 70 in the display region 50 by executing the second example of the first transition display control when the position and orientation information is corrected.

As described above, in the transition display, the control unit 150 may control the display 1 to gradually change the visibility of the virtual object 70. In the above example, the control unit 150 changes the visibility of the virtual object 70 by gradually changing the transparency of the virtual object 70. The control unit 150 may use another method to gradually change the visibility of the virtual object 70. In other examples of the transition display control described below, the control unit 150 is similarly capable of changing the visibility of the virtual object 70 by changing the transparency of the object or by using any method other than this.

For example, the control unit 150 may gradually change the visibility of the virtual object 70 by gradually changing the color of the object. In another example, the virtual object 70 may be displayed blinking. The control unit 150 may gradually change the visibility of the virtual object 70 by gradually changing the intervals between the events of blinking.

The control unit 150 is capable of controlling the speed at which the visibility of the virtual object 70 changes, using various parameters. In other examples of transition display control described as below, the control unit 150 is similarly capable of controlling the speed of change in the visibility of the virtual object 70.

For example, the control unit 150 may control the speed of change in the visibility of the virtual object 70, based on the motion of the display 1. The control unit 150 may increase the speed of change in the visibility of the virtual object 70 with an increase in the speed of change in the position or the orientation of the display 1. In other words, the display 1 is controlled such that, when the speed of change in the position or the orientation of the display 1 is a first speed of change, the speed of change in the visibility of the virtual object 70 is larger than that when the speed of change in the position or the orientation of the display 1 is a second speed of change that is smaller than the first speed of change. The above-described change in the position or the orientation of the display 1 includes changes in the travel speed and the rotational speed of the user (the display 1).

2-2-2. Second Transition Display Control

As illustrated in FIG. 14 to FIG. 18, second transition display control is described, performed by the control unit 150 of the information processing apparatus 100 according to the embodiment.

Figure 14:
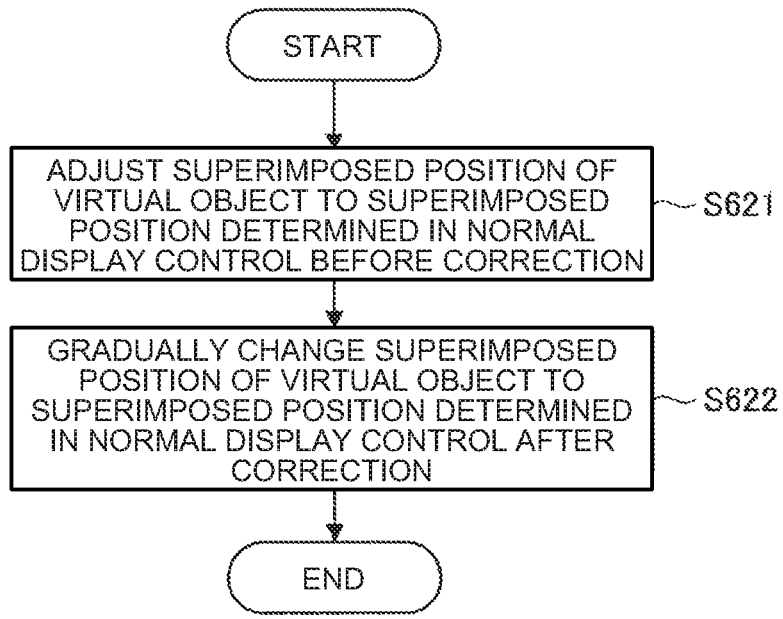
FIG. 14 is a flowchart that illustrates an example flow of a first example of second transition display control performed by the control unit of the information processing apparatus according to the embodiment.

FIG. 14 is a flowchart that illustrates an example flow of a first example of the second transition display control performed by the control unit 150 of the information processing apparatus 100 according to the embodiment.

Upon start of the processing flow of FIG. 14, at Step S621, the control unit 150 adjusts the superimposed position of the virtual object 70 to a superimposed position determined based on the position and orientation information before correction in the normal display control.

At Step S622, the control unit 150 gradually (for example, stepwise) changes the superimposed position of the virtual object 70 to a superimposed position determined in the normal display control after the position and orientation information is corrected.

The processing of FIG. 14 is terminated with this step.

Figure 15:
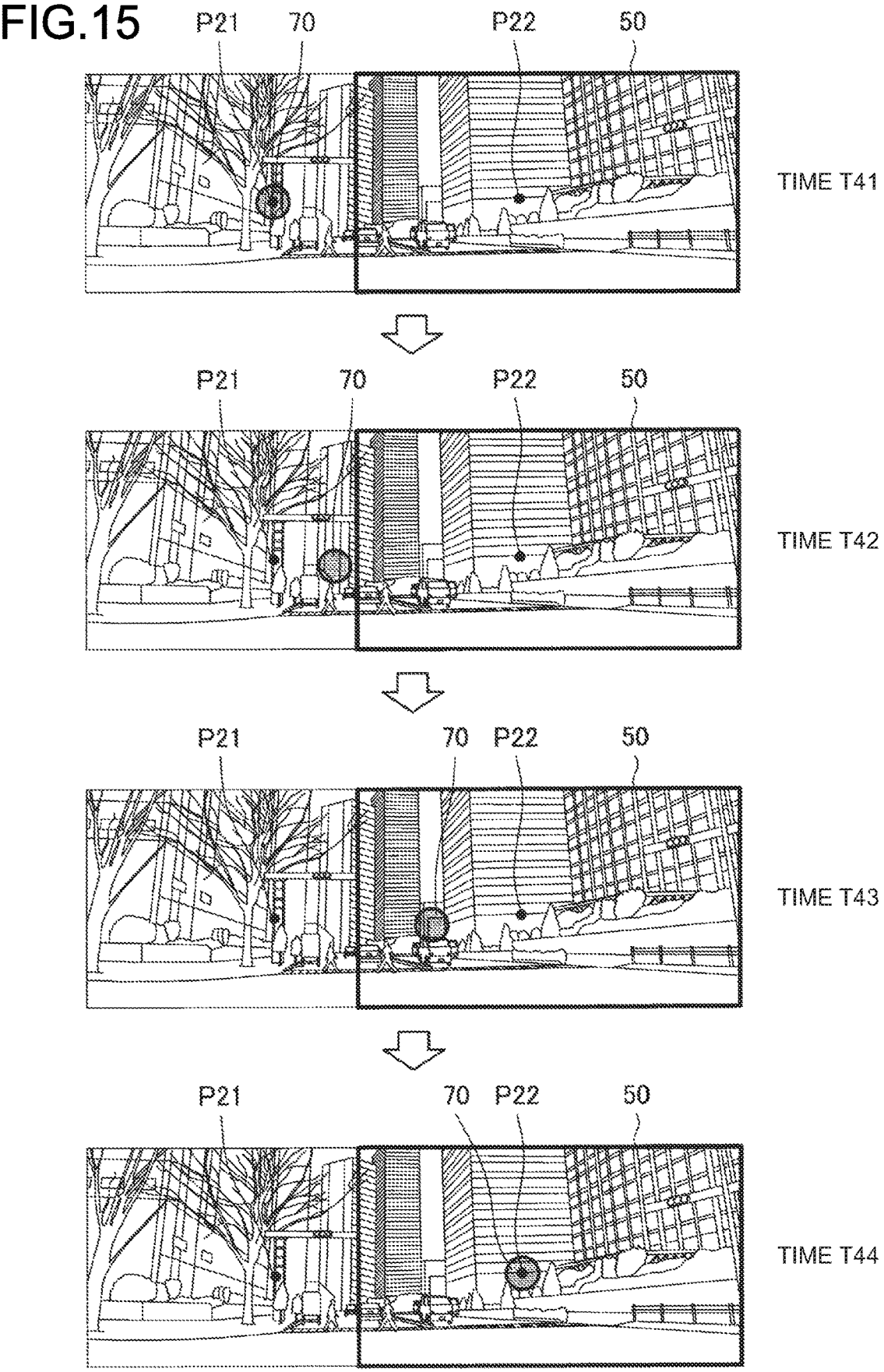
FIG. 15 is an illustrative drawing that indicates an example of display transition in the first example of the second transition display control.

FIG. 15 is an illustrative drawing that indicates an example of display transition in the first example of the second transition display control. FIG. 15 depicts a position P21 as the superimposed position of the virtual object in accordance with the normal display control before correction and a set position P22 as the superimposed position in accordance with the normal display control after correction.

As described above, the second transition display control is executed when the virtual object 70 is determined not to be displayed in the display region 50 right before the start of transition display and determined to be displayed in the display region 50 right after the termination of the transition display. The position P21 as the superimposed position determined in the normal display control before correction, is therefore located outside the display region 50, and the set position P22 as the superimposed position determined in the normal display control after correction is located in the display region 50.

For example, when the first example of the second transition display control is executed at a time T41, the superimposed position of the virtual object 70 is adjusted to the position P21. As illustrated in FIG. 15, the virtual object 70 is therefore not displayed in the display region 50 as is right before the transition display control. The superimposed position of the virtual object 70 is then changed stepwise from the position P21 outside the display region 50 to the set position P22 in the display region 50.

Specifically, at a time T42 later than the time T41, the superimposed position of the virtual object 70 approaches the set position P22 in comparison with the time T41. At the time T42, the superimposed position of the virtual object 70 is placed outside the display region 50 and the virtual object 70 is therefore not displayed in the display region 50. At a time T43 later than the time T42, the superimposed position of the virtual object 70 further approaches the set position P22 in comparison with the time T42. At the time T43, the superimposed position of the virtual object 70 is located inside the display region 50 and the virtual object 70 is therefore displayed in the display region 50. At a time T44 when the virtual object 70 is displayed at the set position P22, the transition display control is switched to the normal display control.

In this manner, the first example of the second transition display control causes the virtual object 70, which has not been displayed in the display region 50 before correction of the position and orientation information, for example, to be displayed at an end portion of the display region 50 upon correction of the position and orientation information and then to move stepwise from the end portion to the set position P22 in the display region 50.

Figure 16:
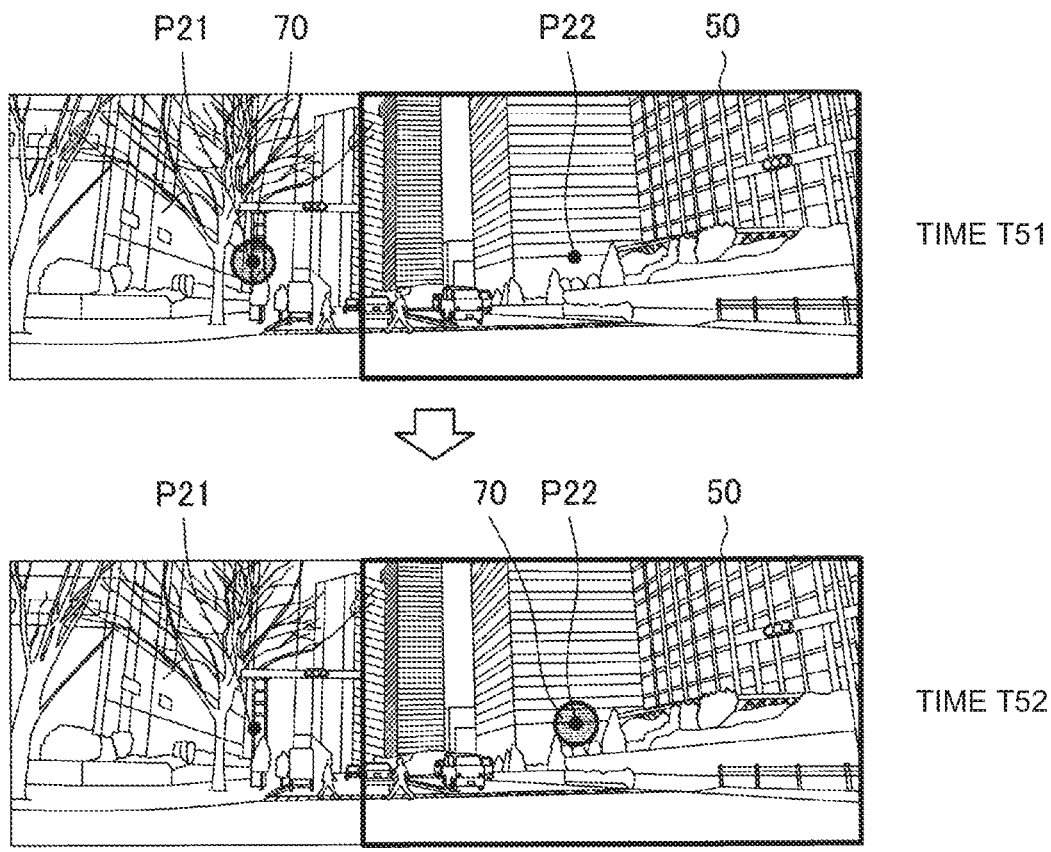
FIG. 16 is an illustrative drawing that indicates an example of display transition by the display control performed by the information processing apparatus according to the reference example.

FIG. 16 is an illustrative drawing that indicates an example of display transition by the display control performed by the information processing apparatus according to the reference example. As described above, the information processing apparatus according to the reference example continues normal display control instead of executing transition display control, upon correction of the position and orientation information. FIG. 16 illustrates example display transition of the reference example, in which the virtual object 70 is not displayed in the display region 50 in the normal display control right before correction of the position and orientation information and the virtual object 70 is displayed in the display region 50 right after correction of the information. In the reference example, for example, as illustrated in FIG. 16, the virtual object 70 that is not displayed in the display region 50 at a time T51 before the position and orientation information is corrected is suddenly displayed at the set position P22 in the display region 50 at a time T52 upon correction of the position and orientation information.

The reference example is configured such that the virtual object 70 is suddenly displayed in the display region 50 upon correction of the position and orientation information. Such sudden appearance of the object causes the user to feel uncomfortable upon correction of the position and orientation information. Moreover, the virtual object 70 suddenly displayed on the line of sight of the user may limit the visibility in front of the user. The information processing apparatus 100 according to the embodiment performs the first example of the second transition display control to prevent the virtual object 70 from suddenly appearing in the display region 50 upon correction of the position and orientation information. The information processing apparatus 100 thus can prevent the user from feeling uncomfortable and from having difficulty in viewing the front upon correction of the position and orientation information.

Figure 17:
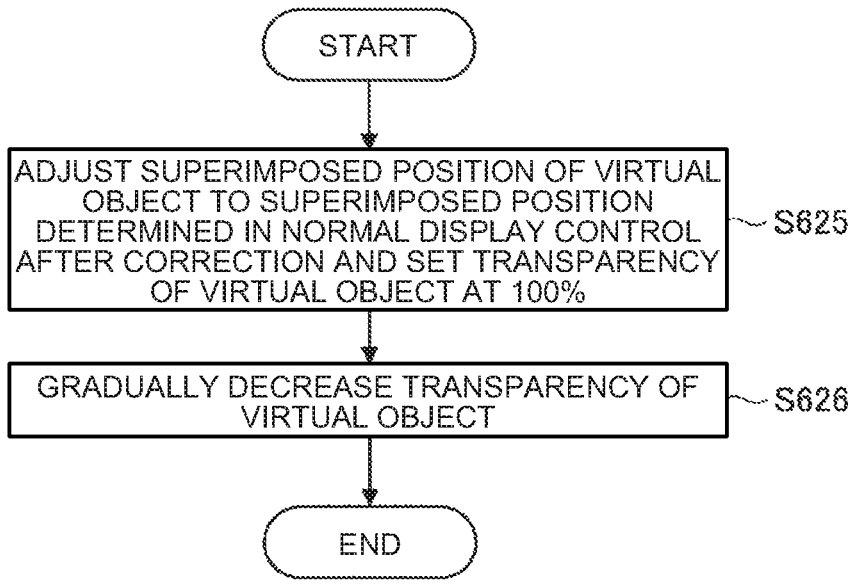
FIG. 17 is a flowchart that illustrates an example flow of a second example of the second transition display control performed by the control unit of the information processing apparatus according to the embodiment.

FIG. 17 is a flowchart that illustrates an example flow of a second example of the second transition display control performed by the control unit 150 of the information processing apparatus 100 according to the embodiment.

Upon start of the processing flow of FIG. 17, at Step S625, the control unit 150 adjusts the superimposed position of the virtual object 70 to a superimposed position determined based on the position and orientation information after correction in the normal display control and sets the transparency of the virtual object 70 at 100%.

At Step S626, the control unit 150 gradually (for example, stepwise) decreases the transparency of the virtual object 70.

The processing of FIG. 17 is terminated with this step.

Figure 18:
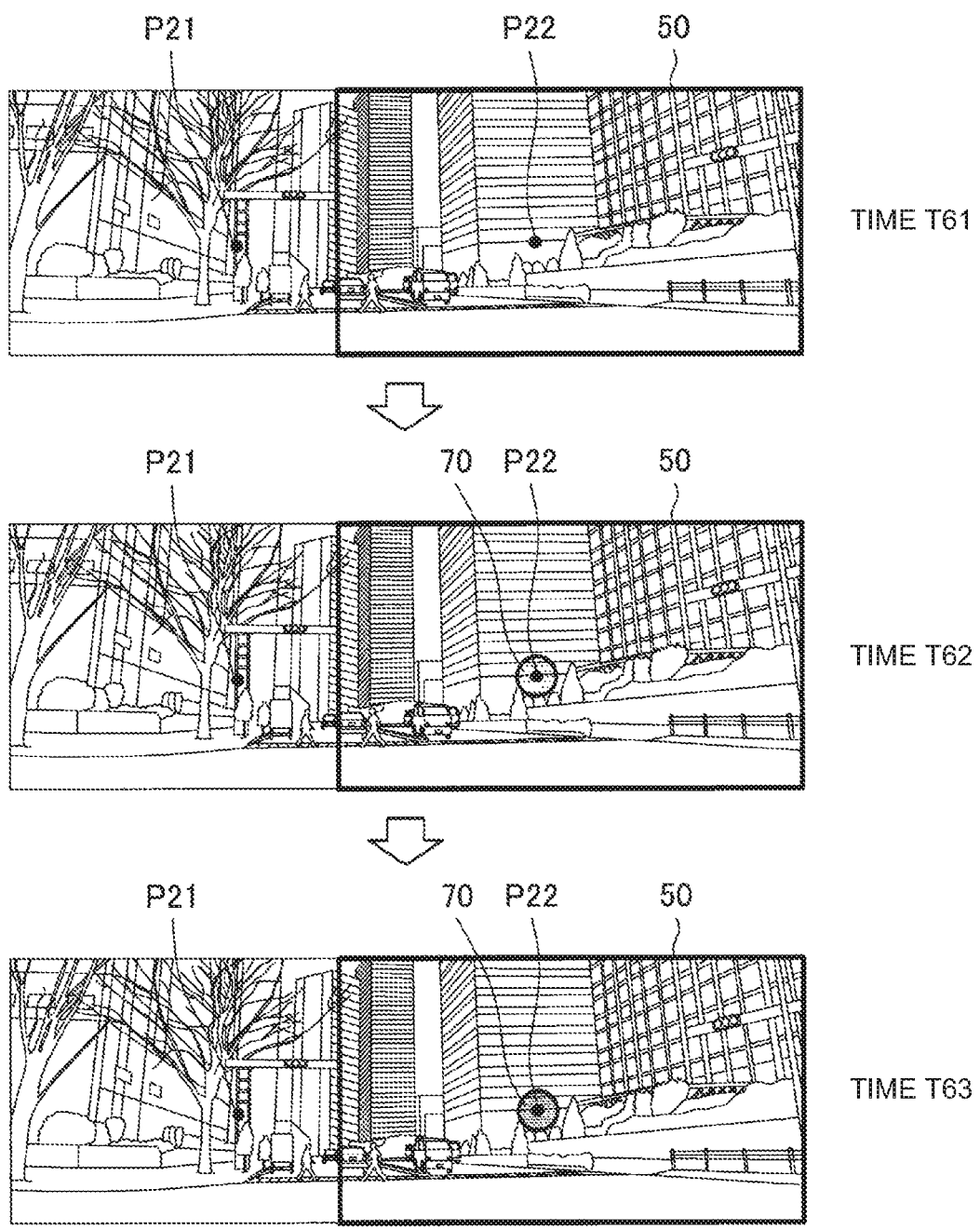
FIG. 18 is an illustrative drawing that indicates an example of display transition in the second example of the second transition display control.

FIG. 18 is an illustrative drawing that indicates an example of display transition in the second example of the second transition display control. As with FIG. 15, FIG. 18 depicts the position P21 as the superimposed position in accordance with the normal display control before correction and the set position P22 as the superimposed position in accordance with the normal display control after correction.

For example, when the second example of the second transition display control executes at a time T61, the superimposed position of the virtual object 70 is adjusted to the set position P22, and transparency of the virtual object 70 is set to 100%. Although the superimposed position of the virtual object 70 is in the display region 50, the virtual object 70 is invisible. The transparency of the virtual object 70 then gets decreased stepwise. Specifically, the transparency of the virtual object 70 at a time T62 later than the time T61 is decreased compared to the time T61. With a further decrease in the transparency of the virtual object 70, the virtual object 70 is displayed at the set position P22 at a time T63, while the transition display control is switched to the normal display control.

In this manner, execution of the second example of the second transition display control causes the virtual object 70 to fade-in at the set position P22 in the display region 50 where the virtual object 70 was invisible before the correction of the position and orientation information, upon correction of the position and orientation information.

As with the first example of the second transition display control, the second example of the second transition display control prevents the virtual object 70 from being suddenly displayed in the display region 50 upon correction of the position and orientation information. The second example is therefore advantageous in preventing the user from feeling uncomfortable and having difficulty in viewing the front due to the sudden appearance of the virtual object 70.

2-2-3. Third Transition Display Control

Figure 19:
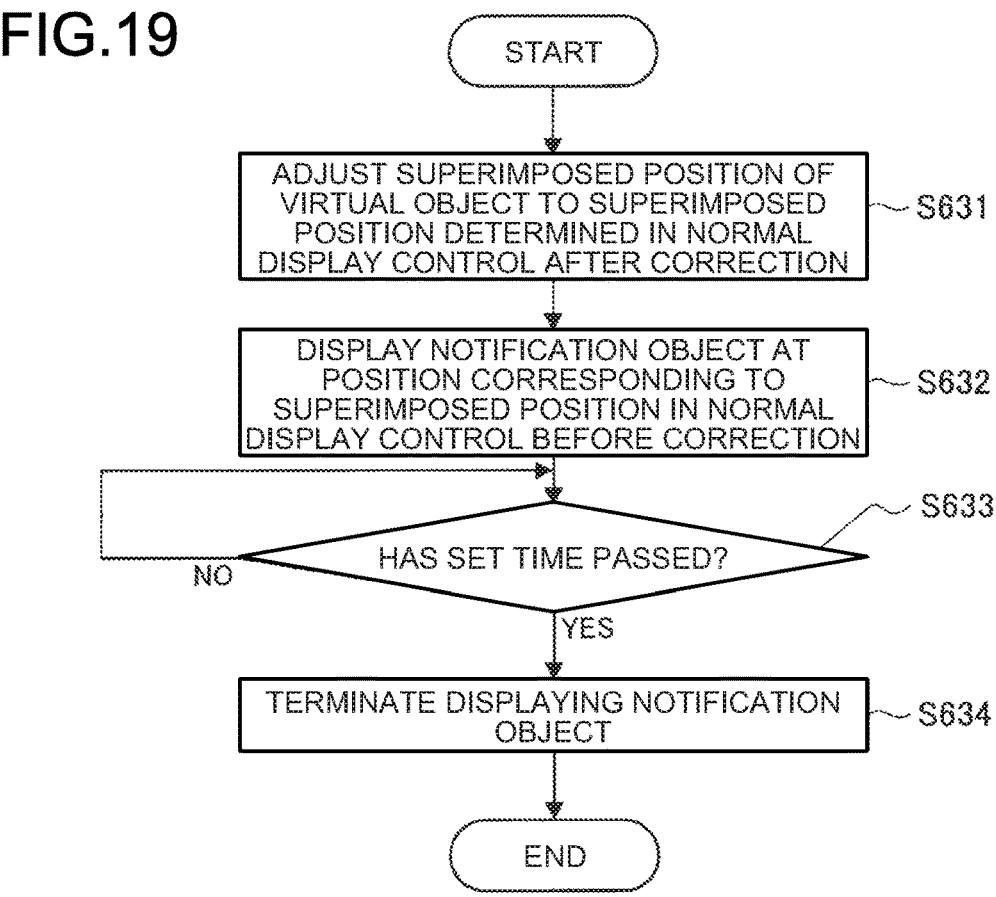
FIG. 19 is a flowchart that illustrates an example flow of third transition display control performed by the control unit of the information processing apparatus according to the embodiment.
Figure 20:
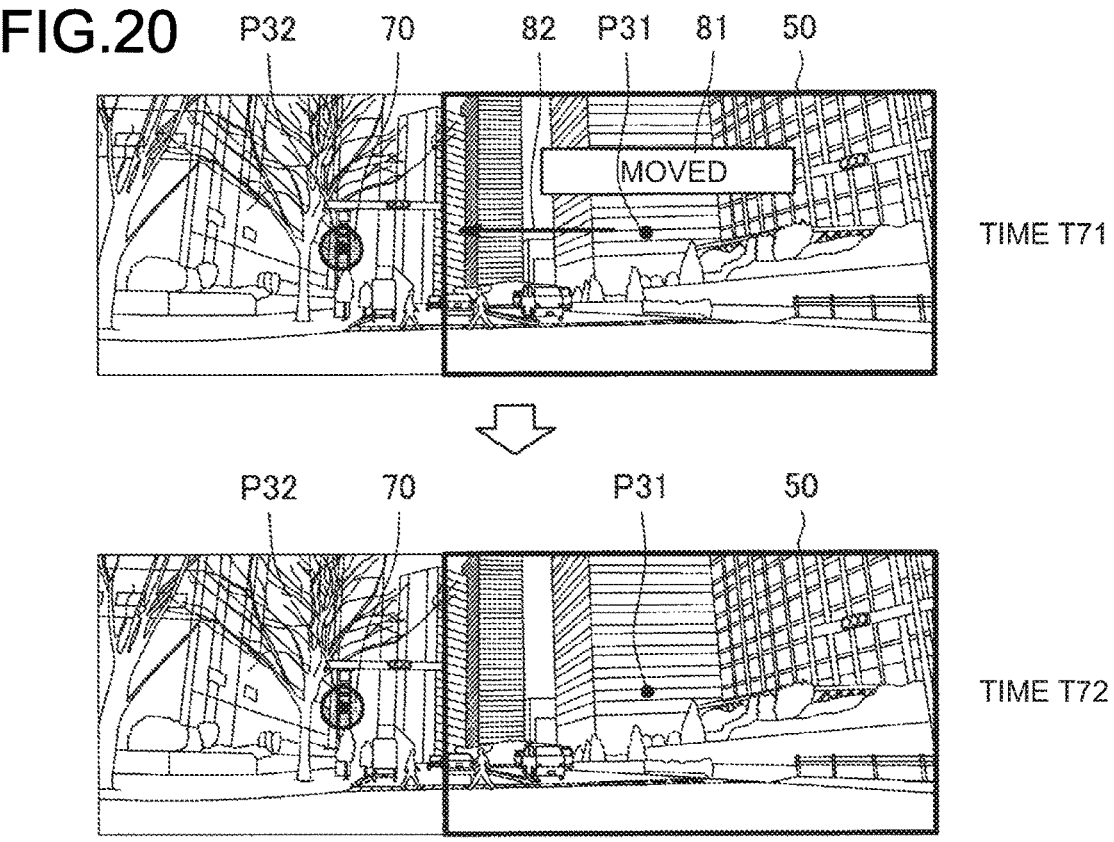
FIG. 20 is an illustrative drawing that indicates an example of display transition in the third transition display control.
Figure 21:
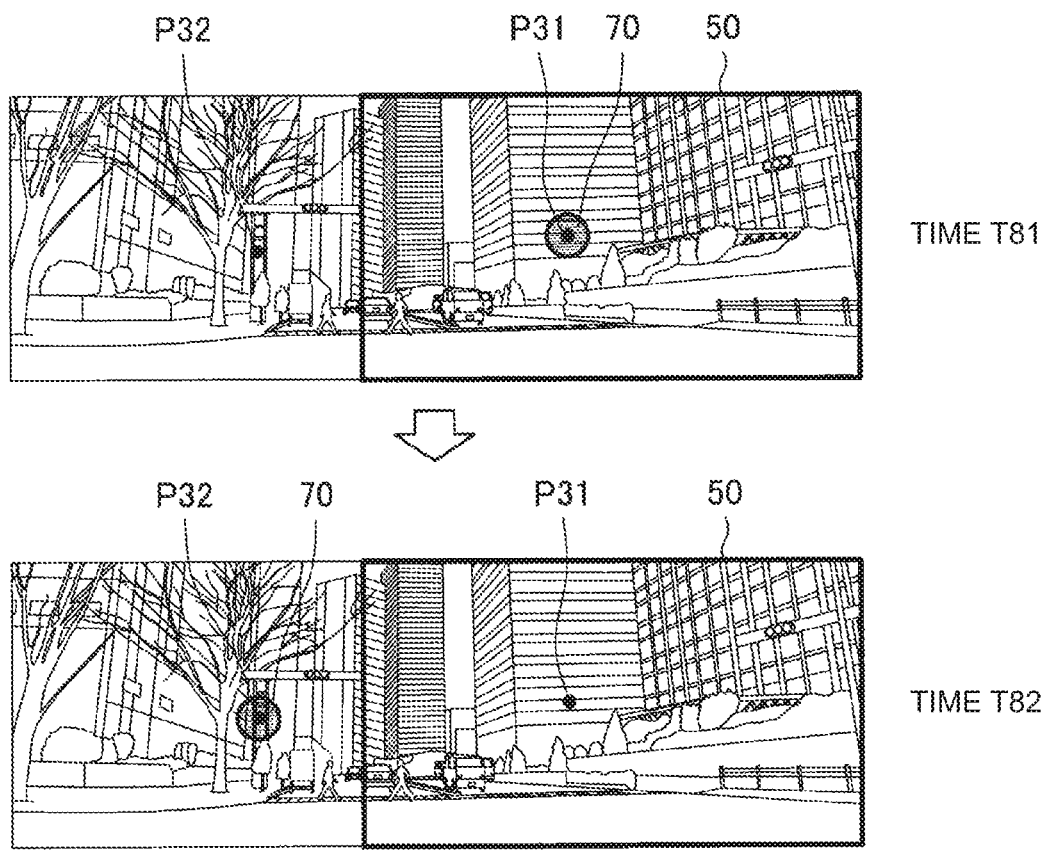
FIG. 21 is an illustrative drawing that indicates an example of display transition controlled by the information processing apparatus according to the reference example.

As illustrated in FIG. 19 to FIG. 21, a third transition display control will be described by the control unit 150 of the information processing apparatus 100 according to the embodiment.

FIG. 19 is a flowchart that illustrates an example flow of the third transition display control performed by the control unit 150 of the information processing apparatus 100 according to the embodiment.

Upon start of the processing flow of FIG. 19, at Step S631, the control unit 150 adjusts the superimposed position of the virtual object 70 to a superimposed position determined based on the position and orientation information after correction in the normal display control.

At Step S632, the control unit 150 makes a notification object to be displayed at a position corresponding to a superimposed position determined based on the position and orientation information before correction in the normal display control. The notification object is a notification object to notify execution of transition of display conditions from a first display condition based on first position and orientation information, which is the position and orientation information before correction, to a second display condition based on second position and orientation information, which is the position and orientation information after correction. In the transition display control, the control unit 150 may control the display 1 to instantaneously change the display conditions of the virtual object 70 from the first display condition based on the first position and orientation information to the second display condition based on the second position and orientation information and to display the notification object. In the transition display, the display conditions of the virtual object 70 include a condition in which the virtual object 70 is displayed in the display region 50, as described later with reference to FIG. 20.

For example, the control unit 150 may display a text object as a notification object. Without being limited thereto, the notification object may be a mark or similar objects. The notification object may be a moving object.

At Step S633, the control unit 150 determines whether a set time has passed. If the set time is determined to have passed (Yes at Step S633), the processing proceeds to Step S634. If the set time is determined not to have passed (No at Step S633), the processing of Step S633 is repeated.

The set time is, for example, a time period having a certain length that guarantees to some extent that the user visually recognizes the notification object.

At Step S634, the control unit 150 stops displaying the notification object.

The processing of FIG. 19 is terminated with this step.

FIG. 20 is an illustrative drawing that indicates an example of display transition in the third transition display control. FIG. 20 depicts a position P31 as the superimposed position in the normal display control before correction, and a set position P32 as the superimposed position in the normal display control after correction.

As described above, the third transition display control is executed when the virtual object 70 is determined to be displayed in the display region 50 right before the start of transition display and determined not to be displayed in the display region 50 right after the termination of the transition display. The position P31 as the superimposed position before correction can therefore be located in the display region 50, and the set position P32 as the superimposed position after correction is located outside the display region 50.

For example, when the third transition display control is performed at a time T71, the superimposed position of the virtual object 70 is adjusted to the set position P32. There is therefore no virtual object 70 displayed in the display region 50. Furthermore, the notification object is displayed at a position corresponding to the position P31 (which may be directly on the position P31 or close to the position P31). For example, as illustrated in FIG. 20, the notification object, consisting of a text object 81 and an arrow 82, is displayed at the position corresponding to the position P31 in the display region 50, to inform that the superimposed position of the virtual object 70 has been moved. At a time T72, when the set time has passed from the start of display of the text object 81 and the arrow 82, the text object 81 and the arrow 82 are non-displayed from the display, and the transition display control is switched to the normal display control.

In this manner, upon correction of the position and orientation information, the third transition display control causes the virtual object 70, having been displayed in the display region 50 before the position and orientation information is corrected, to become non-displayed and causes the notification object to be displayed for a set time.

FIG. 21 is an illustrative drawing that indicates an example of display transition controlled by the information processing apparatus according to the reference example. As described above, the information processing apparatus according to the reference example continues normal display control without performing transition display control, upon correction of the position and orientation information. FIG. 21 specifically illustrates example display transition of the reference example, in which the virtual object 70 is displayed in the display region 50 in the normal display control right before correction of the position and orientation information and the virtual object 70 is not displayed in the display region 50 in the normal display control right after correction of the information. In the reference example, as illustrated in FIG. 21, the virtual object 70 displayed on the position P31 in the display region 50 at a time T81 before correction of the position and orientation information suddenly becomes in a state of non-display at a time T82 upon correction of the position and orientation information.

In the reference example, the virtual object 70 in the display region 50 suddenly becomes in a state of non-display upon correction of the position and orientation information. The user thus may lose sight of the virtual object 70. The information processing apparatus 100 according to the embodiment performs the third transition display control upon correction of the position and orientation information to notify the user of a change in the superimposed position of the virtual object 70 using the notification object. The information processing apparatus 100 thus can prevent the user from losing sight of the virtual object 70 because of the sudden change in the virtual object 70 to a state of non-display.

In the above configuration, display of the notification object is terminated when a set time has passed since the start of display of the notification object. Such a trigger to determine when to terminate the display of the notification object is not limited to this example. For example, the control unit 150 may terminate the display of the notification object when the display 1 is determined to be left terminated for a predetermined time after starting of display of the notification object. The control unit 150 can determine whether the display 1 is left terminated for a predetermined time, for example, based on the position and orientation information. Accordingly, display of the notification object can be prevented from being terminated before the user visually recognizes the notification object.

2-2-4. Supplement

In the above examples referring to FIG. 6, the transition display control is not performed if the virtual object 70 is determined to be displayed in the display region 50 neither right before the start of nor right after the termination of the transition display. The control unit 150 is allowed to perform the transition display control even in that case. For example, the control unit 150 may gradually change the superimposed position of the virtual object 70 from a superimposed position indicated by the position and orientation information before correction to a superimposed position indicated by the position and orientation information after correction.

FIG. 22 is an illustrative drawing that indicates an example of display transition in the transition display control, performed upon determination that no virtual object 70 is displayed in the display region 50 either right before the start of the transition display or right after the termination of the transition display. FIG. 22 depicts a position P41 as the superimposed position in the normal display control before correction and a set position P42 as the superimposed position in the normal display control after correction. Both the position P41 as the superimposed position in the normal display control before correction, and the set position P42 as the superimposed position in the normal display control after correction, can be located outside the display region 50.

For example, when this transition display control executes at a time T91, the superimposed position of the virtual object 70 is adjusted to the position P41. As illustrated in FIG. 22, as is right before the transition display, no virtual object 70 is displayed in the display region 50. The superimposed position of the virtual object 70 then changes stepwise from the position P41 to the set position P42, which are both outside the display region 50.

Specifically, at a time T92 later than the time T91, the superimposed position of the virtual object 70 approaches the set position P42 in comparison with the time T91. At a time T93 later than the time T92, the superimposed position of the virtual object 70 is further close to the set position P42 in comparison with the time T92. At a time T94, the virtual object 70 is displayed at the set position P42, and the transition display control is switched to the normal display control.

Execution of transition display control gradually changes the superimposed positions of the virtual object 70 outside the display region 50, the virtual object 70 being not displayed in the display region 50, upon correction of the position and orientation information. This may occur when the user moves the sight from the virtual object 70 for a moment and the position and orientation information is corrected with the superimposed position of the virtual object 70 located outside the display region 50. In this case, the control unit 150 gradually changes the superimposed positions of the virtual object 70 outside the display region 50, thereby preventing the user from losing sight of the virtual object 70 when he/she brings the sight back to the object right after correction of the position and orientation information.

Although the above-described examples do not refer to whether the user is visually recognizing the virtual object 70 during the display control, the control unit 150 may control the display 1 to perform the transition display based on whether the user is visually recognizing the virtual object 70.

For example, the control unit 150 may control the display 1 to stop the transition display upon determination that the user is not visually recognizing the virtual object 70, and then to resume the transition display upon determination that the user is visually recognizing the virtual object 70. Specifically, in executing the transition display control that gradually changes the superimposed positions or the visibility of the virtual object 70, the control unit 150 may gradually change the superimposed positions or the visibility of the virtual object 70 only when the user is determined to be visually recognizing the virtual object 70.

For example, upon determination that the user is not visually recognizing the virtual object 70, the control unit 150 may perform such transition display in which the speed of change in the superimposed position of the virtual object 70 or the speed of change in the visibility of the virtual object 70 may be increased, in comparison with display control on the virtual object 70 determined to be visually recognized by the user. This operation enables a quick change in the superimposed position or in the visibility of the virtual object 70, in a circumstance where a change in the superimposed position or visibility is difficult for the user to recognize.

The control unit 150 may determine whether the user is visually recognizing the virtual object 70 by detecting the line of sight of the user. Specifically, the detection of the line of sight of the user is realized by using an eye tracking sensor that detects the line of sight of the user. Specifically, the eye tracking sensor is installed to the display 1, particularly, in a position facing the face of the user. The sensor images the face of the user and performs image processing on the image to detect the line of sight of the user. The eye tracking sensor may detect the line of sight of the user based on the direction in which the face is facing or may detect using the corneal reflection.

The control unit 150 may determine whether the user is visually recognizing the virtual object 70 based on, for example, whether the virtual object 70 is being displayed in the display region 50. In other words, the control unit 150 is allowed to determine that the user is visually recognizing the virtual object 70, according to the fact that the virtual object 70 is being displayed in the display region 50.

As described above, the control unit 150 performs the first transition display control or the second transition display control to gradually change the superimposed positions or the visibility of the virtual object 70, for example, if the virtual object 70 is determined to be displayed in the display region 50 right after the termination of the transition display. The control unit 150 further performs the third transition display control to display the notification object, for example, if the virtual object 70 is determined to be displayed in the display region 50 right before the start of the transition display and determined not to be displayed in the display region 50 right after the termination of the transition display. The display control performed by each transition display control is not limited to the above examples.

For example, the first transition display control and the second transition display control may perform display control to display the notification object, in addition to gradually changing the superimposed positions or the visibility of the virtual object 70.

The third transition display control may execute display control to gradually change the superimposed positions or the visually of the virtual object 70. The third transition display control may execute display control to gradually change the superimposed positions or the visibility of the virtual object 70, in addition to displaying the notification object.

For example, the above transition display controls may execute display control to gradually change the superimposed positions of the virtual object 70 while gradually changing the visibility of the virtual object 70 simultaneously. Specifically, in the above transition display controls, the control unit 150 may gradually change the superimposed positions and the visibility of the virtual object 70 such that the visibility is reduced before the move of the superimposed position starts and increased before the move of the superimposed position terminates.

Such an example has not been given in the above description in which a plurality of virtual objects associated with set positions are displayed in the display region 50. In this example, the control unit 150 may execute the transition display control only on some of the virtual objects. For example, the control unit 150 may execute the transition display control exclusively on the virtual objects determined to be visually recognized by the user. Specifically, in the third transition display control, the control unit 150 may make the notification object exclusively for the virtual objects determined to be visually recognized by the user to be displayed. The control unit 150 can determine which virtual objects are visually recognized by the user, for example, by detecting the line of sight of the user. The transition display control is performed only on the virtual objects determined to be visually recognized by the user, thereby preventing an excessive amount of information during the transition display control to be exposed to the user.

3. Effects of Information Processing Apparatus

The information processing apparatus 100 according to the embodiment will now be described.

When the position and orientation information of the display 1 as a mobile body is corrected from first position and orientation information to second position and orientation information that is non-continuous to the first position and orientation information, the information processing apparatus 100 of the embodiment controls the display 1, as a mobile body, to perform transition display indicative of transition of display conditions from a first display condition, in which the virtual object 70 is displayed based on the first position and orientation information, to a second display condition based on the second position and orientation information. Accordingly, difficulty in smooth use of the AR technology by a user due to a sudden change in the superimposed position of the virtual object 70 occurring upon correction of the position and orientation information, can be prevented. As a result, Use of the AR technology can therefore be facilitated.

The information processing apparatus 100 according to the embodiment can control the display 1 to gradually change the superimposed position of the virtual object 70 in the transition display. This control can prevent the user from feeling uncomfortable and from having difficulty in viewing the front, which is caused due to a sudden change in the superimposed position of the virtual object 70 occurring upon correction of the position and orientation information. Use of the AR technology can be therefore facilitated.

The information processing apparatus 100 of the embodiment can control the display 1, as a mobile body, such that, in the transition display, when the speed of change in the position or the orientation of the display 1 is a first speed of change, the speed of change in the superimposed position of the virtual object 70 is larger than that when the speed of change in the position or the orientation of the display 1 is a second speed of change that is smaller than the first speed of change. When the position or the orientation of the display 1 changes at a larger speed, the user is expected to be less aware of a change in the superimposed position of the virtual object 70. The speed of change in the superimposed position of the virtual object 70 is therefore controlled based on the speed of change in the position or the orientation of the display 1, which allows a quick change in the superimposed position with the user prevented from feeling uncomfortable.

The information processing apparatus 100 of the embodiment can control the display 1 to make the speed of change in the superimposed position of a moving virtual object 70 higher, in comparison with a non-animated virtual object 70, in the transition display. If the virtual object 70 is a moving object, it is expected that the user may be less aware of a change in the superimposed position of the virtual object 70, in comparison with a non-moving virtual object 70. The speed of change in the superimposed position of the virtual object 70 is therefore controlled based on whether the virtual object 70 is a moving object. This manner allows a quick change in the superimposed position with the user prevented from feeling uncomfortable.

The information processing apparatus 100 of the embodiment can control the display 1, as a mobile body, to move the superimposed position of the virtual object 70 preferentially in a direction along a straight line connecting the position of the display 1 and superimposed position of the virtual object 70, in the transition display. When the superimposed position is moved in the direction along the straight line connecting the position of the display 1 and superimposed position of the virtual object 70, the user is expected to be less aware of the change in the superimposed position of the virtual object 70 than superimposed position moved in another direction. The virtual object 70 is therefore moved preferentially in the direction along the straight line connecting the position of the display 1 and superimposed position of the virtual object 70, while allowing a quick change in the superimposed position with the user prevented from feeling uncomfortable.

The information processing apparatus 100 of the embodiment can control the display 1 to gradually change the superimposed positions of the virtual object 70 in the transition display, if the virtual object 70 is determined to be displayed in the display region 50 of the display 1 right after the termination of the transition display. Without executing such transition display control, the virtual object 70 displayed in the display region 50 would suddenly move, which may make the user feel uncomfortable. In other cases, the virtual object 70 would be suddenly displayed in the display region 50 and the user may have difficulty in viewing the front. By gradually changing the superimposed positions of the virtual object 70, the user is prevented from feeling uncomfortable and from having difficulty in viewing the front upon correction of the position and orientation information.

The information processing apparatus 100 of the embodiment can control the display 1 to gradually change the visibility of the virtual object 70, in the transition display. This control can prevent the user from feeling uncomfortable and from having difficulty in viewing the front, which is caused due to a sudden change in the superimposed position of the virtual object 70 upon correction of the position and orientation information. Use of the AR technology can be therefore facilitated.

The information processing apparatus 100 of the embodiment can control the display 1, as a mobile body, such that, in the transition display, when the speed of change in the position or the orientation of the display 1 is a first speed of change, the speed of change in the visibility of the virtual object 70 is larger than that when the speed of change in the position or the orientation of the display 1 is a second speed of change that is smaller than the first speed of change. With this control, the user is expected to be less aware of a change in the visibility of the virtual object 70 with an increase in the speed of change in the position or the orientation of the display 1. The speed of change in the visibility of the virtual object 70 is therefore controlled based on the speed of change in the position or the orientation of the display 1. This manner allows a quick change in the visibility of the virtual object 70 with the user prevented from feeling uncomfortable.

The information processing apparatus 100 according to the embodiment controls the display 1 to gradually change the visibility of the virtual object 70 by gradually changing the transparency of the virtual object 70, in the transition display. This control allows the virtual object 70 to fade in or fade out in the display region 50, thereby effectively changing the visibility of the virtual object 70.

The information processing apparatus 100 of the embodiment can control the display 1 to gradually change the visibility of the virtual object 70, in the transition display, if the virtual object 70 is determined to be displayed in the display region 50 right after the termination of the transition display. Without executing such transition display control, the virtual object 70 displayed in the display region 50 would suddenly move, which may make the user feel uncomfortable. In other cases, the virtual object 70 would be suddenly displayed in the display region 50 and the user may have difficulty in viewing the front. Gradually changing the visibility of the virtual object 70 thus can prevent the user from feeling uncomfortable and from having difficulty in viewing the front, upon correction of the position and orientation information.

The information processing apparatus 100 of the embodiment can control the display 1 to instantaneously change the display conditions of the virtual object 70, in the transition display, from a first display condition in association with first position and orientation information to a second display condition in association with second position and orientation information and to display the notification object to inform that transition display has executed. This control can prevent the user from losing sight of the virtual object 70 due to a sudden change in the superimposed position of the virtual object 70 occurring with correction of the position and orientation information. Use of the AR technology can be therefore facilitated.

The information processing apparatus 100 of the embodiment can control the display 1 to display a text object as the notification object, in the transition display. The user can be appropriately notified of a change in the superimposed position of the virtual object 70.

The information processing apparatus 100 of the embodiment can control the display 1 to display the notification object in the transition display, if the virtual object 70 is determined to be displayed in the display region 50 right before the start of the transition display and determined not to be displayed in the display region 50 right after the termination of the transition display. Without executing such transition display control, the virtual object 70 displayed in the display region 50 would suddenly disappear. The user therefore may lose sight of the virtual object 70 upon correction of the position and orientation information. Displaying the notification object therefore enables appropriately protecting the user from losing sight of the virtual object 70 upon correction of the position and orientation information.

The information processing apparatus 100 of the embodiment can control the display 1 to execute the transition display based on whether the user is visually recognizing the virtual object 70. Accordingly, the transition display control can be appropriately executed based on how easy the user can notice a change in the superimposed position or the visibility of the virtual object 70.

The information processing apparatus 100 of the embodiment can determine whether the user is visually recognizing the virtual object 70 by detecting the line of sight of the user. Accordingly, whether the user is visually recognizing the virtual object 70 can be appropriately determined.

The information processing apparatus 100 of the embodiment can control the display 1 to stop the transition display when the user is determined not to be visually recognizing the virtual object 70 and then to resume the transition display when the user is determined to be visually recognizing the virtual object 70. The user can be appropriately notified of an occurrence of transition with correction of the position and orientation information.

The information processing apparatus 100 of the embodiment can correct the position and orientation information when an error, detected by the position and orientation sensor 30, in the position and orientation information exceeds a threshold. Accordingly, a deviation between the superimposed position and the set position of the virtual object 70 can be appropriately prevented.

4. Summary

As described above, the information processing apparatus 100 according to the embodiment includes a control unit 150 that controls the display 1 to superimpose a virtual object, associated with a set position in the real world, on the real world, with reference to the position and orientation information of a mobile body. The control unit 150 controls the display 1 to perform transition display indicative of transition of display conditions from a first display condition, which displays the virtual object 70 based on first position and orientation information, to a second display condition based on second position and orientation information, when the position and orientation information is corrected from the first position and orientation information to the second position and orientation information that is non-continuous to the first position and orientation information. Use of the AR technology can be therefore facilitated.

The above examples describe the cases that information used for each processing performed by the information processing apparatus 100 is stored in the storage unit 120 of the information processing apparatus 100. Such information may be stored in any device external to the information processing apparatus 100. The communication unit 110 communicates with the external device to obtain such information to the information processing apparatus 100. In this case, the storage unit 120 may be omitted from the configuration of the information processing apparatus 100.

The above examples describe the cases that the position and orientation sensor 30 is installed in the display 1; however, the position and orientation sensor 30 may be installed outside the display 1. In other words, the position and orientation sensor 30 does not necessarily integrally move with the display 1. The position and orientation sensor 30 may be installed in a vehicle, on the road, in a building, and similar places. Even in such a case, the information processing apparatus 100 communicates with the position and orientation sensor 30 and can obtain information related to the position and the orientation of the display 1 from the position and orientation sensor 30.

The above examples describe the cases that the information processing apparatus 100 is installed in the display 1; however, the information processing apparatus 100 may be installed outside the display 1. In other words, the information processing apparatus 100 does not necessarily integrally move with the display 1. Even in such a case, the information processing apparatus 100 can control operation of the display 1 by communicating with the display 1.

The series of control processing performed by the components described in the specification may be implemented by any of software, hardware, and a combination of software and hardware. A computer program composing the software is stored in, for example, a storage medium (a non-transitory media) in advance, the storage medium being installed inside or outside the component. The computer program is loaded onto a RAM when being executed and is executed by a processor such as a CPU. The computer program may be executed by one processor or a plurality of processors.

Specifically, the computer program used to implement the above functions of the information processing apparatus 100 can be created and installed to a system such as a personal computer (PC). The information processing apparatus 100 may correspond to a computer. A computer-readable storage medium storing such a computer program can be provided. Examples of the storage medium include a magnetic disk, an optical disk, a magneto-optical disk, and a flash memory. The computer program may be distributed via a network instead of using a storage medium. The functions of the information processing apparatus 100 may be dispersed to a plurality of computers. In such a case, each computer may implement the function using the above computer program.

The processing described in the specification using a flowchart is not necessarily performed in the order illustrated in the flowchart. Some of the processing steps may be performed in parallel. A supplementary processing step may be added to the processing flow. Some processing steps may be omitted from the flow.

Preferred embodiments have been described in detail with reference to the accompanying drawings. It should be noted that the technical scope of the present disclosure is not limited to the described examples. The skilled person having common knowledge about the technical field of the present disclosure could apparently conceive of various changes and modifications without departing from the scope of the technical thoughts in the appended claims. These changes and modifications are obviously included in the technical scope of the present disclosure.

The effects described in the specification are merely for illustration and examples, and they are not limiting. The technology according to the present disclosure exerts various advantageous effects along with or instead of the above effects and is allowed to bring other benefits that are apparent to the skilled person from description of the specification.

The following configurations are included in the technical scope of the present disclosure.

(1)

An information processing apparatus, comprising:

a control unit that controls a display to superimpose a virtual object, associated with a set position on a real world, on the real world with reference to position and orientation information indicative of a position and an orientation of a mobile body; and a correction unit that corrects the position and orientation information, wherein when the position and orientation information is corrected from first position and orientation information to second position and orientation information that is non-continuous to the first position and orientation information, the control unit controls the display to perform transition display that indicates transition of a display condition from a first display condition that displays the virtual object based on the first position and orientation information to a second display condition that displays the virtual object based on the second position and orientation information.

(2)

The information processing apparatus according to (1), wherein the control unit controls the display to gradually change a superimposed position of the virtual object, in the transition display.

(3)

The information processing apparatus according to (2), wherein the control unit controls the display to set a speed of change in the superimposed position when a speed of change in a position or an orientation of the mobile body is a first speed of change, larger than a speed of change when the speed of change in the position or the orientation of the mobile body is a second speed of change that is smaller than the first speed of change, in the transition display.

(4)

The information processing apparatus according to (2) or (3), wherein the control unit controls the display to set a speed of change in the superimposed position when the virtual object is a moving object, larger than a speed of change in the superimposed position when the virtual object is a non-moving object, in the transition display.

(5)

The information processing apparatus according to any one of (2) to (4), wherein the control unit controls the display to change the superimposed position preferentially in a direction along a straight line connecting a position of the mobile body and the superimposed position, in the transition display.

(6)

The information processing apparatus according to any one of (2) to (5), wherein the control unit controls the display to gradually change the superimposed position, in the transition display, when the virtual object is determined to be displayed in a display region of the display right after a termination of the transition display.

(7)

The information processing apparatus according to any one of (1) to (6), wherein the control unit controls the display to gradually change visibility of the virtual object, in the transition display.

(8)

The information processing apparatus according to (7), wherein the control unit controls the display to set a speed of change in the visibility when a speed of change in a position or an orientation of the mobile body is a first speed of change, larger than a speed of change in the visibility when the speed of change in the position or the orientation of the mobile body is a second speed of change that is smaller than the first speed of change, in the transition display.

(9)

The information processing apparatus according to (7) or (8), wherein the control unit controls the display to gradually change the visibility by gradually changing transparency of the virtual object, in the transition display.

(10)

The information processing apparatus according to any one of (7) to (9), wherein the control unit controls the display to gradually change the visibility, in the transition display, when the virtual object is determined to be displayed in a display region right after a termination of the transition display.

(11)

The information processing apparatus according to any one of (1) to (10), wherein the control unit controls the display to instantaneously change a display condition of the virtual object, in the transition display, from the first display condition in association with the first position and orientation information to the second display condition in association with the second position and orientation information and to display a notification object to notify of execution of the transition display.

(12)

The information processing apparatus according to (11), wherein the control unit controls the display to display a text object as the notification object, in the transition display.

(13)

The information processing apparatus according to (11) or (12), wherein the control unit controls the display to display the notification object, in the transition display, when the virtual object is determined to be displayed in a display region right before a start of the transition display and determined not to be displayed in the display region right after a termination of the transition display.

(14)

The information processing apparatus according to any one of (1) to (13), wherein the control unit controls the display to execute the transition display based on a determination whether a user is visually recognizing the virtual object.

(15)

The information processing apparatus according to (14), wherein the control unit controls the display to determine whether the user is visually recognizing the virtual object by detecting a line of sight of the user.

(16)

The information processing apparatus according to (14) or (15), wherein the control unit controls the display to stop the transition display upon determination that the user is not visually recognizing the virtual object, and then to resume the transition display upon determination that the user is visually recognizing the virtual object.

(17)

The information processing apparatus according to any one of (1) to (16), wherein the display is a head-mounted display.

(18)

The information processing apparatus according to any one of (1) to (17), wherein the position and orientation information is detected by a position and orientation sensor configured to detect a position and an orientation of the mobile body, and the correction unit corrects the position and orientation information when an error, detected by the position and orientation sensor, in the position and orientation information is equal to or larger than a threshold.

(19)

A information processing method, comprising:

controlling a display to superimpose a virtual object, associated with a set position on a real world, on the real world with reference to position and orientation information indicative of a position and an orientation of a mobile body; and correcting the position and orientation information, wherein when the position and orientation information is corrected from first position and orientation information to second position and orientation information that is non-continuous to the first position and orientation information, the control unit controls the display to perform transition display that indicates transition of a display condition from a first display condition that displays the virtual object based on the first position and orientation information to a second display condition based on the second position and orientation information.

(20)

A computer program that causes a computer to function as:

a control unit that controls a display to superimpose a virtual object, associated with a set position on a real world, on the real world with reference to position and orientation information indicative of a position and an orientation of a mobile body; and a correction unit that corrects the position and orientation information, wherein when the position and orientation information is corrected from first position and orientation information to second position and orientation information that is non-continuous to the first position and orientation information, the control unit controls the display to perform transition display that indicates transition of a display condition from a first display condition that displays the virtual object based on the first position and orientation information to a second display condition based on the second position and orientation information.

REFERENCE SIGNS LIST

1 DISPLAY
20 CAMERA
30 POSITION AND ORIENTATION SENSOR
50 DISPLAY REGION
70 VIRTUAL OBJECT
100 INFORMATION PROCESSING APPARATUS
110 COMMUNICATION UNIT
120 STORAGE UNIT
130 UPDATE UNIT
140 CORRECTION UNIT
150 CONTROL UNIT

The invention claimed is:

1. An information processing apparatus, comprising:
a control unit configured to:
control a display to superimpose a virtual object on a real world, wherein
the virtual object is associated with a set position on the real world, and
the superimposition of the virtual object is based on first position and orientation information indicative of a position and an orientation of a mobile body; and
a correction unit configured to correct, based on an error in the first position and orientation information that is equal to or larger than a threshold value, the first position and orientation information to second position and orientation information that is non-continuous to the first position and orientation information,
wherein the control unit is further configured to control, based on the correction, the display to perform transition display that indicates transition of a display condition from a first display condition in which the virtual object is displayed based on the first position and orientation information to a second display condition in which the virtual object is displayed based on the second position and orientation information.

2. The information processing apparatus according to claim 1, wherein the control unit is further configured to control the display to gradually change a superimposed position of the virtual object, in the transition display.

3. The information processing apparatus according to claim 2, wherein
the control unit is further configured to control the display to:
set, in the transition display, a first speed of change in the superimposed position based on a first speed of change in at least one of the position or the orientation of the mobile body; and
set, in the transition display, a second speed of change in the superimposed position based on a second speed of change in the at least one of the position or the orientation of the mobile body,
the first speed of change in the superimposed position is larger than the second speed of change in the superimposed position, and
the second speed of change in the at least one of the position or the orientation of the mobile body is smaller than the first speed of change in the at least one of the position or the orientation of the mobile body.

4. The information processing apparatus according to claim 2, wherein
the control unit is further configured to control the display to:
set, in the transition display, a first speed of change in the superimposed position in a case where the virtual object is a moving object; and
set, in the transition display, a second speed of change in the superimposed position in a case where the virtual object is a non-moving object, and
the first speed of change in the superimposed position is larger than the second speed of change in the superimposed position.

5. The information processing apparatus according to claim 2, wherein the control unit is further configured to control the display to change, in the transition display, the superimposed position preferentially in a direction along a straight line connecting the position of the mobile body and the superimposed position.

6. The information processing apparatus according to claim 2, wherein the control unit is further configured to:
determine the virtual object is displayed in a display region of the display after a termination of the transition display; and
gradually change the superimposed position in the transition display based on the determination the virtual object is displayed in the display region.

7. The information processing apparatus according to claim 1, wherein the control unit is further configured to control the display to gradually change visibility of the virtual object, in the transition display.

8. The information processing apparatus according to claim 7, wherein the control unit is further configured to control the display to set a speed of change in the visibility when a speed of change in at least one of the position or the orientation of the mobile body is a first speed of change, larger than a speed of change in the visibility when the speed of change in the at least one of the position or the orientation of the mobile body is a second speed of change that is smaller than the first speed of change, in the transition display.

9. The information processing apparatus according to claim 7, wherein the control unit is further configured to control the display to gradually change the visibility by gradually changing transparency of the virtual object, in the transition display.

10. The information processing apparatus according to claim 7, wherein the control unit is further configured to control the display to gradually change the visibility, in the transition display, when the virtual object is determined to be displayed in a display region right after a termination of the transition display.

11. The information processing apparatus according to claim 1, wherein the control unit is further configured to control the display to instantaneously change the display condition of the virtual object, in the transition display, from the first display condition in association with the first position and orientation information to the second display condition in association with the second position and orientation information and to display a notification object to notify of execution of the transition display.

12. The information processing apparatus according to claim 11, wherein the control unit is further configured to control the display to display a text object as the notification object, in the transition display.

13. The information processing apparatus according to claim 11, wherein the control unit is further configured to control the display to display the notification object, in the transition display, when the virtual object is determined to be displayed in a display region right before a start of the transition display and determined not to be displayed in the display region right after a termination of the transition display.

14. The information processing apparatus according to claim 1, wherein the control unit is further configured to:
determine a user is one of visually recognizing the virtual object or not visually recognizing the virtual object; and
control the display to execute the transition display based on the determination that the user is visually recognizing the virtual object.

15. The information processing apparatus according to claim 14, wherein the control unit is further configured to control the display to
determine the user is visually recognizing the virtual object by detection of a line of sight of the user.

16. The information processing apparatus according to claim 14, wherein the control unit is further configured to control the display to stop the transition display based on the determination that the user is not visually recognizing the virtual object, and then to resume the transition display based on the determination that the user is visually recognizing the virtual object.

17. The information processing apparatus according to claim 1, wherein the display is a head-mounted display.

18. The information processing apparatus according to claim 1, wherein a position and orientation sensor:
detects the position and the orientation of the mobile body, and
detects the error in the first position and orientation information.

19. An information processing method, comprising:
controlling a display to superimpose a virtual object on a real world, wherein
the virtual object is associated with a set position on the real world, and
the superimposition of the virtual object is based on first position and orientation information indicative of a position and an orientation of a mobile body;
correcting, based on an error in the first position and orientation information that is equal to or larger than a threshold value, the first position and orientation information to second position and orientation information that is non-continuous to the first position and orientation information; and
controlling, based on the correction, the display to perform transition display that indicates transition of a display condition from a first display condition in which the virtual object is displayed based on the first position and orientation information to a second display condition in which the virtual object is displayed based on the second position and orientation information.

20. A non-transitory computer-readable medium having stored thereon computer-executable instructions which, when executed by a processor, cause the processor to execute operations, the operations comprising:
controlling a display to superimpose a virtual object on a real world, wherein
the virtual object is associated with a set position on the real world, and
the superimposition of the virtual object is based on first position and orientation information indicative of a position and an orientation of a mobile body;
correcting, based on an error in the first position and orientation information that is equal to or larger than a threshold value, the first position and orientation information to second position and orientation information that is non-continuous to the first position and orientation information; and
controlling, based on the correction, the display to perform transition display that indicates transition of a display condition from a first display condition in which the virtual object is displayed based on the first position and orientation information to a second display condition in which the virtual object is displayed based on the second position and orientation information.

21. An information processing apparatus, comprising:
a control unit configured to:
control a display to superimpose a virtual object on a real world, wherein
the virtual object is associated with a set position on the real world, and
the superimposition of the virtual object is based on first position and orientation information indicative of a position and an orientation of a mobile body; and
a correction unit configured to correct the first position and orientation information to second position and orientation information that is non-continuous to the first position and orientation information, wherein
the control unit is further configured to:
control, based on the correction, the display to perform transition display that indicates transition of a display condition from a first display condition in which the virtual object is displayed based on the first position and orientation information to a second display condition in which the virtual object is displayed based on the second position and orientation information;

control the display to gradually change a superimposed position of the virtual object, in the transition display;

set, in the transition display, a first speed of change in the superimposed position based on a first speed of change in at least one of the position or the orientation of the mobile body; and set, in the transition display, a second speed of change in the superimposed position based on a second speed of change in the at least one of the position or the orientation of the mobile body, the first speed of change in the superimposed position is larger than the second speed of change in the superimposed position, and the second speed of change in the at least one of the position or the orientation of the mobile body is smaller than the first speed of change in the at least one of the position or the orientation of the mobile body.

* * * * *